US012432312B1

(12) United States Patent
Scharer, III

(10) Patent No.: US 12,432,312 B1
(45) Date of Patent: Sep. 30, 2025

(54) CHROMA KEY COMPOSITING AND LIGHTING ADJUSTMENT SYSTEM

(71) Applicant: DROPKEY, Inc., Los Angeles, CA (US)

(72) Inventor: Rockwell L Scharer, III, Los Angeles, CA (US)

(*) Notice: Subject to any disclaimer, the term of this patent is extended or adjusted under 35 U.S.C. 154(b) by 329 days.

(21) Appl. No.: 17/752,748

(22) Filed: May 24, 2022

Related U.S. Application Data

(60) Continuation-in-part of application No. 17/707,545, filed on Mar. 29, 2022, now Pat. No. 12,035,069, which is a continuation of application No. 16/539,710, filed on Aug. 13, 2019, now Pat. No. 11,290,660, which is a division of application No. 15/914,641, filed on Mar. 7, 2018, now Pat. No. 10,382,706.

(60) Provisional application No. 63/243,057, filed on Sep. 10, 2021, provisional application No. 62/468,663, filed on Mar. 8, 2017.

(51) Int. Cl.
*H04N 5/275* (2006.01)
*H04N 9/75* (2006.01)
*H04N 23/56* (2023.01)
*H04N 23/60* (2023.01)
*H04N 23/661* (2023.01)
*H04N 23/74* (2023.01)

(52) U.S. Cl.
CPC ............ *H04N 5/275* (2013.01); *H04N 9/75* (2013.01); *H04N 23/56* (2023.01); *H04N 23/64* (2023.01); *H04N 23/661* (2023.01); *H04N 23/74* (2023.01)

(58) Field of Classification Search
CPC .......... H04N 5/275; H04N 9/75; H04N 23/56; H04N 23/64; H04N 23/661; H04N 23/74
See application file for complete search history.

(56) References Cited

U.S. PATENT DOCUMENTS 6,122,013 A * 9/2000 Tamir ...................... H04N 9/75
348/592
7,184,047 B1  2/2007 Crampton
(Continued)

OTHER PUBLICATIONS

PCT/US22/43264 International Search Report and Written Opinion, Mailed Jan. 9, 2023.

*Primary Examiner* — Michael E Teitelbaum

(57) ABSTRACT

A system and, related method, is disclosed for enabling Chroma key compositing using a smart device, wherein an image/video of a subject situated in front of a portable monochromatic background is captured, and simultaneously layered upon a different desired background replacement that will replace only the monochromatic background captured. The portable monochromatic background structure can be a three-dimensional lighting structure affixed with a plurality of lighting modules configured to ensure a uniform light distribution across the monochromatic background and separately to ensure a uniform light distribution on the subject during the image/video capture. Moreover, a software application on a smart device can act as a system platform that enables for automatic processing of pixel correction in the monochromatic background during the Chroma key process in real-time, and light adjustment of the lighting modules on a portable monochromatic background to correct any light imperfections that impede color neutrality on the background.

13 Claims, 18 Drawing Sheets

(56) References Cited

U.S. PATENT DOCUMENTS

| | | | |
|---|---|---|---|
| 9,894,423 B1* | 2/2018 | Spencer | H04N 21/812 |
| 2007/0222869 A1* | 9/2007 | Ciccotti | H04N 5/77 |
| | | | 348/E5.022 |
| 2008/0166111 A1* | 7/2008 | Didow | H04N 9/75 |
| | | | 396/3 |
| 2010/0250510 A1 | 9/2010 | Herberger et al. | |
| 2011/0069200 A1* | 3/2011 | Oh | H04N 23/70 |
| | | | 348/E5.037 |
| 2015/0227028 A1* | 8/2015 | Ley | H04N 19/20 |
| | | | 352/49 |
| 2015/0260474 A1* | 9/2015 | Rublowsky | F41A 33/00 |
| | | | 434/16 |
| 2020/0090632 A1 | 3/2020 | Rein et al. | |

\* cited by examiner

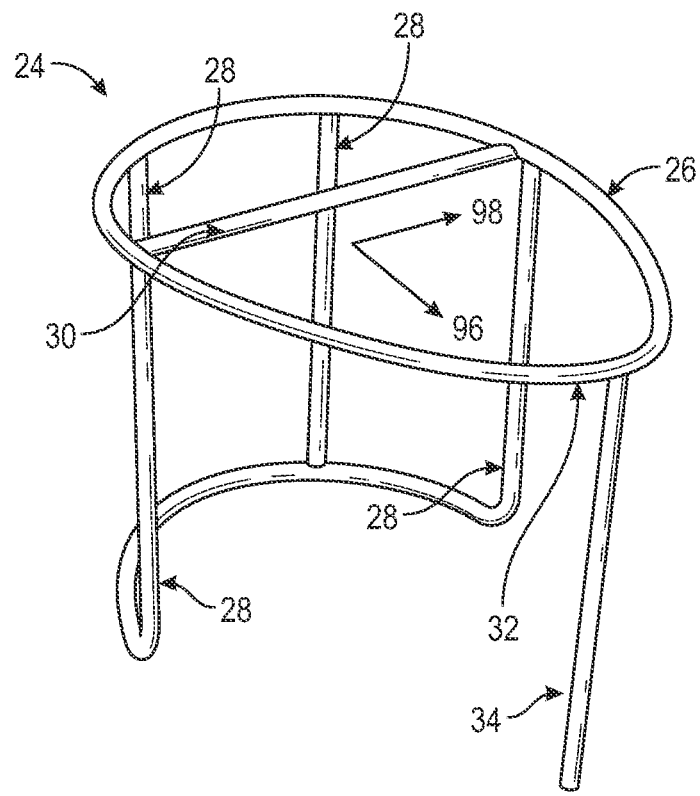
FIG. 2
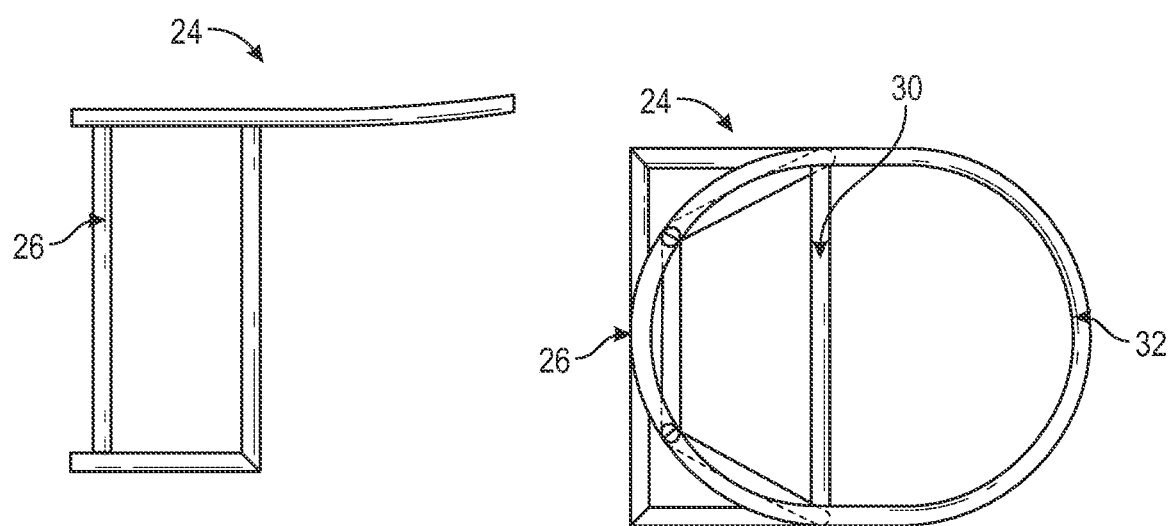
FIG. 3A
FIG. 3B

CHROMA KEY COMPOSITING AND LIGHTING ADJUSTMENT SYSTEM

CROSS REFERENCE TO RELATED APPLICATION

This application is a Continuation-in-part of U.S. patent application Ser. No. 17/707,545 filed Mar. 29, 2022, which claims benefit of 63/243,057 filed Sep. 10, 2021 and is a Continuation of U.S. patent application Ser. No. 16/539,710 filed Aug. 13, 2019, which in turn is a Divisional of U.S. patent application Ser. No. 15/914,641 filed Mar. 7, 2018, which in turn claims the benefit of and priority to U.S. Provisional App. No. 62/468,663, filed Mar. 8, 2017. All of the above applications are hereby incorporated herein by reference.

FIELD OF THE INVENTION

The present invention relates generally to layering an image/video behind a captured image/video, and, more particularly, using a smart device and a mobile, physical lighting structure to create a Chroma key composite image/video with corrections for lighting imperfection.

BACKGROUND OF THE INVENTION

The term green screen has entered the mainstream language due to its widespread use by television production companies. The technical term, Chroma key compositing, or Chroma keying, involves positioning a subject in front of a monochromatic color background, capturing an image/video of the subject while simultaneously layering a desired background replacement content behind the captured image/video, and removing any visibility of the monochromatic background captured thereby displaying the background replacement content as located behind the subject. The result is an image/video where the subject deceptively appears to be in a location different from their actual location in front of the monochromatic background. Thus, a person can capture an image/video appearing to be in front of a warm sunny beach when they are actually located in a cold dark warehouse. Television production companies use Chroma key compositing for a variety of uses, including news, special effects, and video games. One of the most well-known examples is a weatherperson that appears to stand in front of a map of a given location going over the forecast, when in reality, the weatherperson is standing and looking at a blank "green screen".

As aforementioned, Chroma key compositing consists of layering two images together with respect to color hues, wherein a specified color range is essentially made transparent, enabling a background replacement to be visible. Any color can be used as the monochromatic color, but green and blue are the most typical colors, as they provide the best distinction from most human skin colors or clothing.

Lighting is an important factor to perfecting a Chroma key composite since imperfect or non-uniform lighting on a monochromatic background may impede color neutrality, thereby potentially causing distortions in the background replacement content as it is layered. As such, traditional Chroma key compositing used by television production studios require an extensive amount of equipment, include a large monochromatic background that is surrounded by sufficient lighting so as to ensure that a true color neutral background is achieved. Moreover, production companies may employ post-production techniques in order to correct any imperfections in such color neutrality. As such, the process in creating a high-quality Chroma key composite is time-consuming and expensive, considering the large amount of space and equipment that may be required. These requirements therefore place a burden on the average consumer attempting to execute this process, commonly known as "mobile content capture", rendering difficulties in creating such high-quality Chroma key composites.

SUMMARY OF THE INVENTION

Briefly, and in general terms, the invention is embodied in a portable Chroma key compositing system enabling a smart device and camera to capture an image/video of a subject located in front of a monochromatic color background, and further removing the monochromatic color background visibility to reveal a desired background content layered behind the captured image/video. The monochromatic background can be embodied in a portable structure that is affixed with targeted lighting to provide a uniform light distribution across the monochromatic background. Moreover, the smart device can include a processor or can be in operative communication with a remote processor, enabling automatic lighting adjustment on the background structure to correct any lighting imperfections that impede color neutrality (e.g., balance).

More specifically, by example and not limitation, the background structure can be embodied in a three-dimensional lighting structure comprising of tubes or poles that will be oriented in an upright position when inflated. The tubes or poles create a frame that can be enclosed with a stretchable fabric that provides a monochromatic color background featuring a back wall, with two side-walls extended thereof, and a first ceiling extending from the top of the three walls, extending partially across the open front space of the structure. The three-dimensional lighting structure can also contain an overhang ceiling that extends from the first ceiling, and is used to support corrective lighting modules and block light from other sources.

In another detailed aspect of an exemplary embodiment, the three-dimensional lighting structure can be affixed with lighting modules along the inner edge of the sidewalls that are focused on illuminating the background structure. Additional lighting modules can be affixed along the inner or lower edge of the first ceiling that are focused on illuminating the background structure and a subject located in front of the background. Each lighting module can consist of a plurality of light sources that are attached to a common base, such as LED ribbon lights or LED tube lights. The light sources can be configured to target illumination of the monochromatic background in smaller sections, such as by quadrant. The lighting modules can be powered by directly connecting the lighting modules to an external power source, such as a power outlet, or by connecting to an external battery that is connected to a power source, such as a Lithium battery.

In yet another detailed aspect of an exemplary embodiment, lighting modules can be affixed to the overhang ceiling, wherein said lighting modules will be focused on a subject region of whose image is being captured, so as to enable uniform lighting across the subject region. The overhang ceiling lighting modules can each consist of LED panels, distributed along the inner edge or below the overhang ceiling. The LED panels can be powered through direct connection to an external power source, or connected to a Lithium battery that is connected to an external power source, wherein the connecting power cables can run beneath the stretchable fabric. The LED panels can also be recharged while stored in a separate case.

In yet another detailed aspect of an exemplary embodiment, the background structure is affixed with a processor, acting as a controller that is in operative communication with each individual light source located on the various lighting modules attached to the background structure. Each individual light source can be assigned a specific location data point for identification by the controller. As such, the controller can adjust the illumination of each light source individually, which include dimming, brightening, and in some cases changing the color of the respective light source.

In yet another detailed aspect of an exemplary embodiment, a software application embedded on the smart device can act as a system platform for a Chroma key compositing system that can comprise the smart device, and a background structure controller, wherein said components can be in operative communication over a network. Moreover, the network may enable communication with a remote cloud server, a remote e-commerce server, and online content such as Internet web sites.

In yet another detailed aspect of an exemplary embodiment, the smart device can be a personal computing device, including a smart phone that is equipped with a camera. Moreover, the background structure controller can contain a plurality of wired and wireless data inputs, and can further receive audio data from various sources.

In yet another detailed aspect of an exemplary embodiment, the system platform can contain a database management system (DBMS) that maintains user data, login credential data, a background replacement library data, and created composites data.

In yet another detailed aspect of an exemplary embodiment, the system platform can contain a compositing module, a lighting adjustment module, an audio module, an editing module, and a cloud sync module. The compositing module provides a platform to capture an image/video of a subject that is layered simultaneously over selected background replacement content, and removes the visibility of a monochromatic color detected in the captured image/video to reveal the background replacement content as located behind the subject. The background replacement content can be an image or video played back from the DBMS, or can be a video streamed from a cloud server. The lighting adjustment module provides a platform for detecting lighting imperfections on a paired monochromatic background structure, wherein the location of the imperfections can be identified, and corrective action(s) to correct such imperfections is computed. Corrective actions include dimming, changing color and/or brightening the illumination imposed at the location on the monochromatic background structure used in the Chroma key process wherein lighting imperfection(s) exists. The lighting adjustment module can further relay the identified locations of the lighting imperfections and the corresponding corrective actions to a controller that will subsequently adjust the corresponding lighting sources' illumination to remove the lighting imperfections. This process enables a user to achieve perfect, live, real-time high-definition Chroma key on a smart device, wherein the background replacement content appears crisp and unnoticeable that Chroma key is even being used. The audio module provides a platform for receiving various audio inputs from the controller that can be selectively mixed and distributed with the captured image/video. The editing module enables background replacement content to be edited using features available on the smart device or cloud server, including transcoding an atypical file format to a common file format used by the system platform. The cloud sync module provides a platform to stream a truncated or entire background replacement video, that can be edited and/or looped, from a cloud server and to layer said streamed video behind a captured subject image/video. The cloud sync module further provides a platform to sync and store a background replacement video and/or image to the smart device, enabling the video and/or image to be played back for a composite image/video creation.

In yet another detailed aspect of an exemplary embodiment, the system platform enables content found over a network, such as the Internet, that was selected and stored on a remote cloud server by another software application, to be stored on the smart device by syncing the cloud server with the smart device for later background replacement. Background replacement content may be edited or looped in the remote cloud server and synced or streamed to the smart device in its edited, transcoded format.

In yet another detailed aspect of an exemplary embodiment, an e-commerce system provide a platform for background replacement content to be created, edited, purchased and sold with features that only background replacement content would require, for e.g. transcoding, re-formatting, streaming, and looping playback.

In an alternative embodiment, the background structure can be embodied in a monochromatic color pop-up screen that can be stored and opened in an umbrella fashion. The monochromatic screen can be equipped with a light cluster that extends from an intermediate section of the screen, providing a uniform light distribution across the screen. The screen height can be adjusted by being affixed to a spine that is telescoping and extendable, thereby enabling the screen to be placed on a desktop or on the floor. The screen can be folded and rotated towards the frame. The screen can be opened using a spring mechanism or electric actuation. The screen can further contain a controller in operative communication with a smart device and the screen lighting, wherein the controller can adjust the lighting to correct any lighting imperfections as detected by the smart device.

In an alternative embodiment, a smart device with a camera can be secured to a rolling frame that can be remotely positioned such that a subject can be captured and recorded by the smart device's camera, wherein the subject appears to be well-placed in a desired camera shot. The rolling frame can be equipped with a motor, that can steer and move the rolling frame, and a GPS receiver, all of which is in operative communication with a second smart device. Based on a desired location of a subject in a camera shot, the second smart device can position the rolling frame via the GPS receiver and motor such that the smart device camera secured to the rolling frame achieves the desired camera shot, also known as "blocking". The rolling frame can further include a light stand and additional lighting modules to illuminate the subject in specific places to light the subject's chest, and to provide light above the subject, also known as the "key" light.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

In various embodiments a software application is configured to automatically adjust color within the background image relative to a color of the subject and/or a background image includes a real-time image of a second subject optionally captured during capture of an image of the subject.

BRIEF DESCRIPTION OF THE DRAWINGS

Embodiments of the present invention will now be described, by way of example only, with reference to the following drawings in which:

FIG. 2 is an internal frame of the background structure in FIG. 1A, depicting inflated tubes standing upright.

FIG. 3A is a side view of the internal frame in FIG. 2, depicting the tubes defining the first ceiling and overhang ceiling.

FIG. 3B is a top view of the internal frame in FIG. 2, depicting the ellipsoidal top portion of the inflated tubes.

DETAILED DESCRIPTION

Figure 1A:
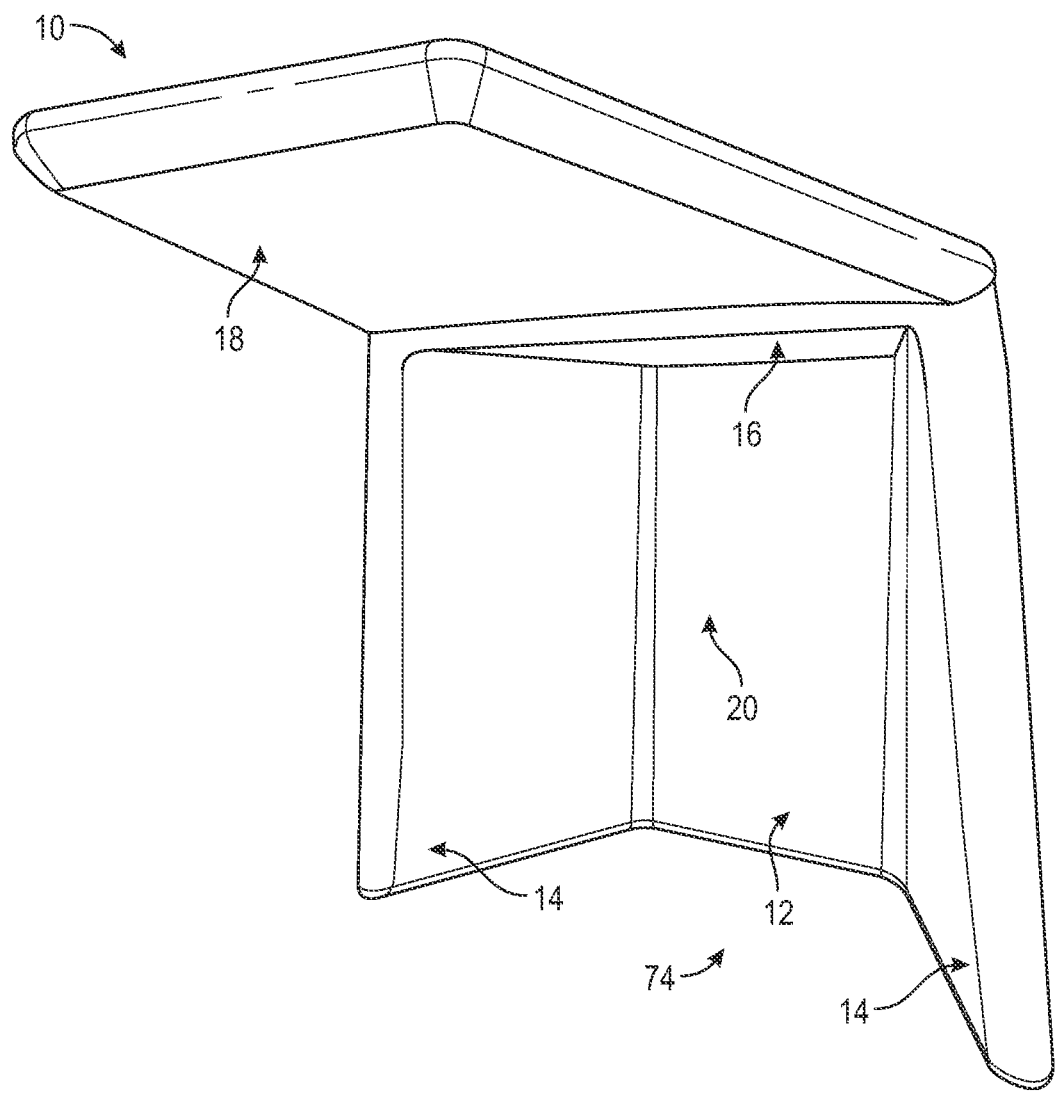
FIG. 1A is a front angled view of a background structure in accordance with the invention depicting a monochromatic color background with a subject region.

With reference now to the drawings, there is shown a system and, related method, which facilitate a portable Chroma key compositing process using a portable monochromatic color background structure that is affixed with targeted lighting modules for uniform light distribution across the monochromatic background structure, and targeted lighting modules for a subject. The image/video of a subject is captured in front of the background structure and layered in front of a desired background replacement image/video in real-time, without post-production or additional equipment, wherein the visibility of the monochromatic color is removed, revealing the background replacement image/video behind the subject in sharp, high-definition. Chroma key compositing of an image optionally includes "balancing" of lighting between a subject and a background so as to make the subject and the background appear to by lit similarly by a lighting source and/or to make the subject appear to actually be in a location of the background. Typically, this balancing includes changing the intensity and/or color of lighting directed at the subject and/or the background. However, in some embodiments balancing can also include control of lighting so as to reproduce shadows and non-uniform lighting effects. For example, in some embodiments the software application(s) discussed herein includes a trained machine learning system configured to estimate a direction of lighting in the background, and logic configured to reproduce this lighting direction (by control of any of the light sources discussed herein) on the subject, optionally in real-time. Specifically, if lighting in the background appears to come from the left side, then the logic (hardware, firmware, and/or software stored on a non-transient medium) within the system may be used to illuminate the subject more strongly from the left relative to the right. This adaption to the direction of lighting in the background may change in real-time as the background changes. The processor may also be configured to balance lighting based on a trained machine learning system. For example the processor may be configured to identify imperfect pixels entering the Chroma key algorithm and uses machine learning and human segmentation to detect and correct imperfections in the monochromatic key, or other characteristic used to distinguish pixels to be replace by a background.

As used herein, the term "balance" is meant to mean adjusting lighting characteristics of subject(s) and replacement images such that they appear to match, and/or the resulting composite image includes a combination of subject and replacement image(s) that looks realistic. Balancing can include changing the lighting provided by any of the various light sources discussed herein and/or by changing characteristics of either image using computer based logic after image capture. For example, if the replacement images include a brightly light beach scene, then the subject would also be brightly light (using light sources) so that the lighting of the beach and the subject are balanced. Likewise, if the background image includes a dark room and/or shadows, the subject(s) may be lit to match these lighting conditions. Balancing can include color balancing as well as overall light intensity balancing. A result of balancing is optionally that the combination of subject and replacement images appear more realistic together, relative to unbalanced lighting. In some embodiments, balancing includes real-time or prior knowledge of the replacement images (at a time subject images are generated). Thus, processor 92 is optionally configured to perform balancing of subject(s) and replacement image(s) in real-time, using the various light sources disclosed herein, as the subject images are captured. This feature and/or other balancing features can be used in combination with any of the embodiments disclosed herein.

The background replacement content may be referred to herein as a replacement image or background image. In either case, such image can include a still image, one of a sequence of images (e.g., a video frame), an image of an augmented environment, and/or a view of a computer-generated virtual environment. For example, a replacement image can be a view of a time varying three-dimensional computer-generated virtual environment (e.g., at least partially rendered), wherein the point of view from which the view is generated may change with movement of a subject, e.g., a viewpoint within a video game. In such an example, balancing within a composite image can include real-time variation in texturing and lighting within the virtual environment. A background image need not necessarily be behind a subject. Relative to a camera, the surface on which a background image is place can be behind, beside and/or in front of a subject, or between two different subjects. The background replacement content optionally includes live video. For example, a background replacement content can include a live video feed (e.g., streaming video) of another subject located at a remote location (optionally with another green screen), that content can be placed on a first screen, other content can be placed on a second screen closer to the camera, and a primary subject then placed in front for the second screen. A resulting composite video can appear as the two subjects are in the same room and interacting together in real-time.

Figure 10:
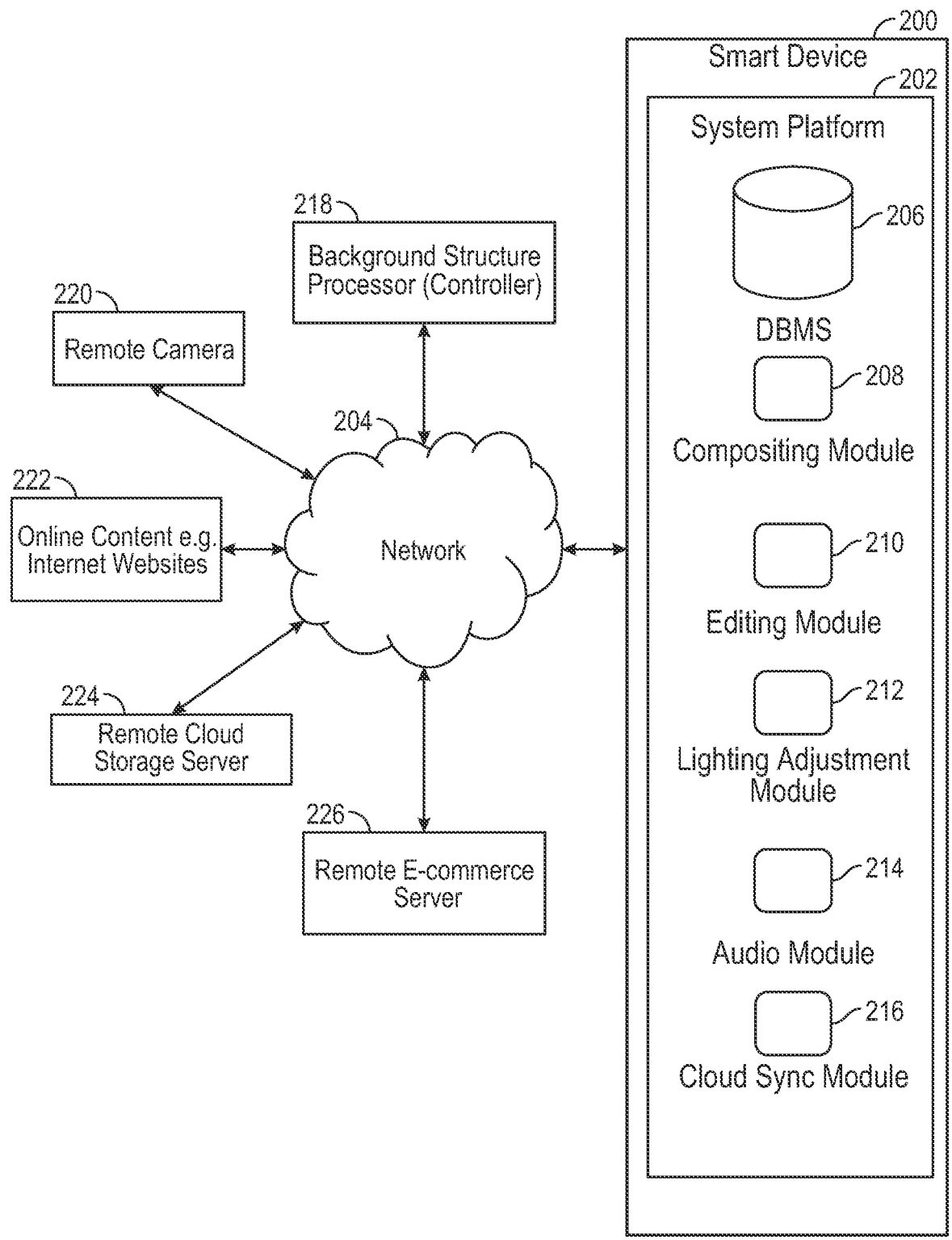
FIG. 10 depicts a simplified block diagram of a Chroma key compositing system in accordance with the invention.

With reference to FIG. 10, a software application embedded in a smart device provides a system platform 202 to initiate and control the Chroma key compositing process, including correcting any imperfections in background color neutrality, and further providing a platform for transferring background replacement images/videos (background replacement content) to/from a remote server. As such, users can create a broadcast quality Chroma key composite image/video of a subject with a desired background replacement, without requiring the traditionally large and expensive post-production equipment, space requirements and post-production labor.

Figure 1B:
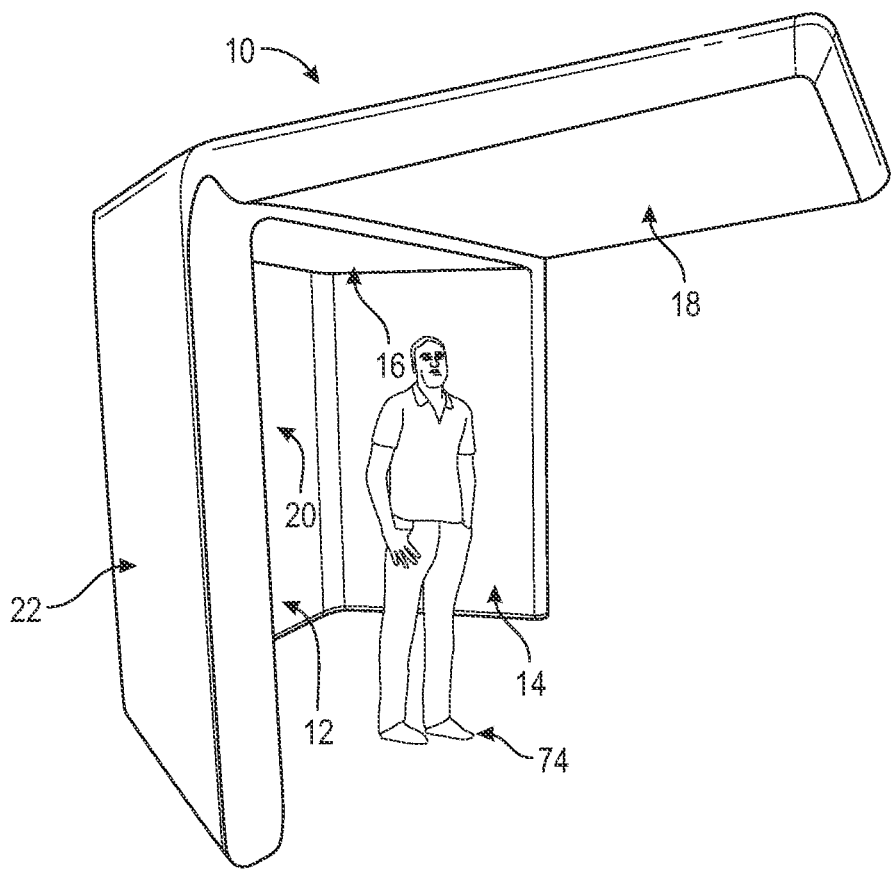
FIG. 1B is a front side view of the background structure in FIG. 1A, depicting the exterior surface of the monochromatic background.

Portable Background Structure. With reference now to FIGS. 1A-B, an exemplary background structure is embodied in a three-dimensional lighting structure 10, with a back wall 12, two sidewalls 14 extending thereof, a first ceiling 16 and an overhang ceiling 18 that extends from the first ceiling. The sidewalls 14 are configured to extend outwardly from the back wall 12. In an alternative embodiment, the sidewalls can be configured to extend perpendicular to the back wall. The overhang ceiling 18 is configured to extend beyond the sidewall 14 edges. Moreover, the overhang ceiling can be configured to extend perpendicular to the back wall vertical axis, i.e., horizontally, or the overhang ceiling can extend in an upward orientation, as depicted in FIG. 3A embodiment of three-dimensional lighting structure frame. The interior surfaces 20 of the back wall, sidewalls, and first ceiling display a monochromatic color, which is typically green or blue since they distinguish the most from typical human skin color and clothing. The monochromatic color displayed can however be any color as desired, provided the same monochromatic color is used. The exterior surface 22 of the three-dimensional lighting structure and the entire overhang ceiling can be any color as it is not relevant within the camera shot, but provides a means to block light from other sources, as well as a structure to affix lighting modules, as described below.

Figure 4:
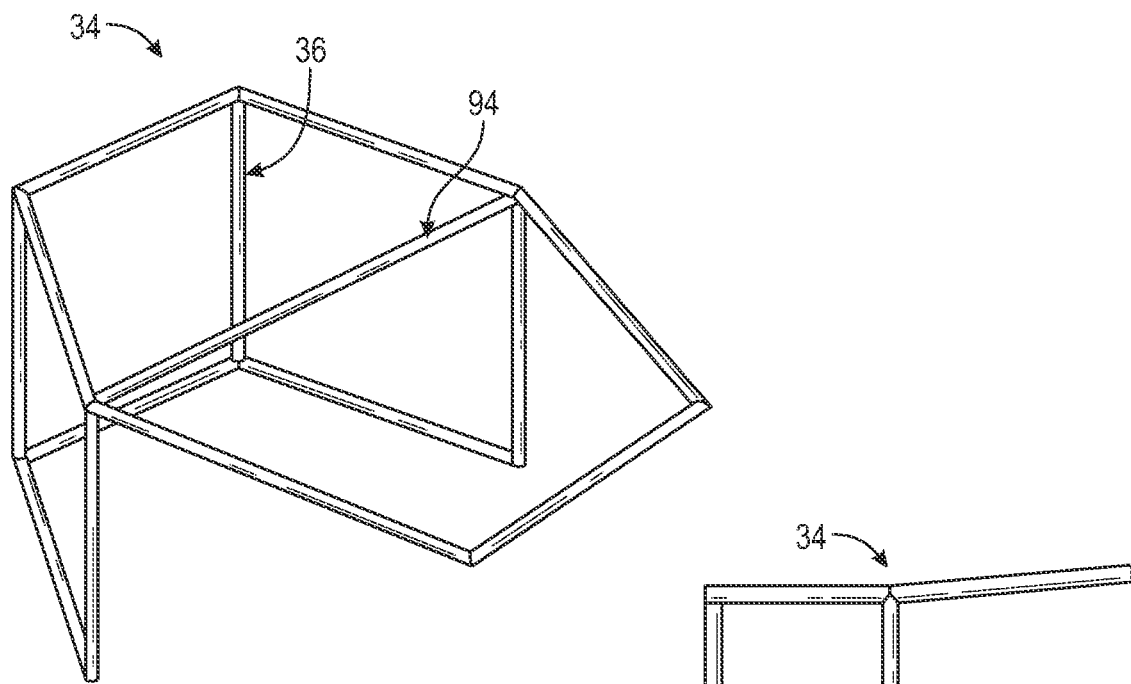
FIG. 4 is an internal frame of a background structure in accordance with the invention depicting inflated tubes standing upright.
Figure 5A:
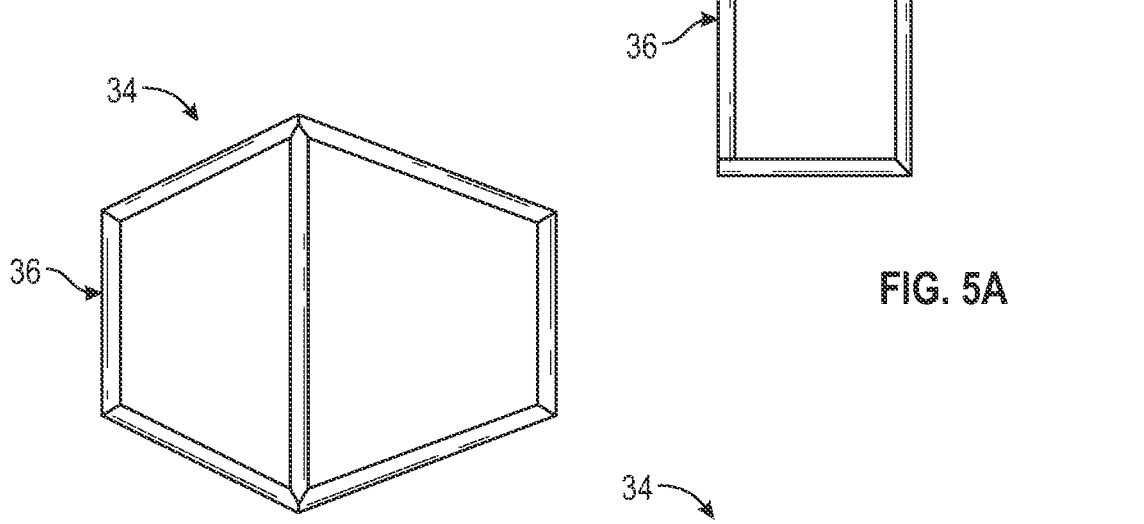
FIG. 5A is a side view of the internal frame in FIG. 4, depicting the tubes defining the first ceiling and overhand ceiling.
Figure 5B:
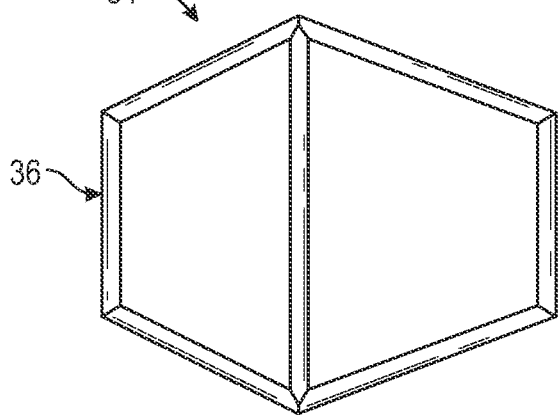
FIG. 5B is a top view of the internal frame in FIG. 4, depicting the hexagonal top portion of the inflated tubes.
Figure 5C:
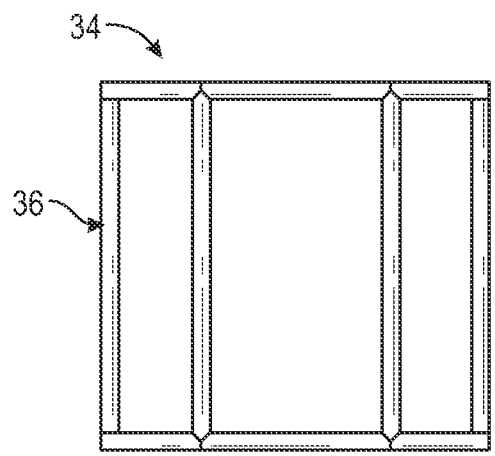
FIG. 5C is a back view of the internal frame in FIG. 4, depicting the tubes as connected together.

Referring now to FIGS. 2-5, the three-dimensional lighting structure comprises a base frame 24, 34 constructed with a plurality of connected three-dimensional lighting structure tubes or poles 26,28,36 configured to stand in an upright position when deployed. As described below, the poles or tubes 26,28,36 are enclosed within a stretchable fabric (not shown) that provides the three-dimensional lighting structure 10 its shape and color. The base frame may be configured in a shape resembling a vertical cylinder with an ellipsoidal top (FIGS. 2-3B), or a hexagonal configuration (FIG. 4-5B). Referring now to FIG. 2, the base frame 24 further includes four vertical tubes 28 and a connecting horizontal tube 30 thereof, that together define the back-wall, sidewalls, and first ceiling of the three-dimensional lighting structure when the fabric is stretched to enclose the base frame 24. The overhang ceiling is defined by the base frame top portion that extends 32 opposite of the tubes defining the back wall. A third vertical tube 34 may be used to support the overhang ceiling, and further support a universal smart device mount (not shown) wherein a camera can be secured when capturing the image/video of the subject. The third vertical tube 34 can be removable, or rotatably joined to the base frame in a manner such that the third vertical tube 34 can be rotated upwards and placed across the longitudinal axis of the overhang ceiling. The ellipsoidal top in FIG. 2 can further be defined by a major axis 96, and minor axis 98.

Figure 6:
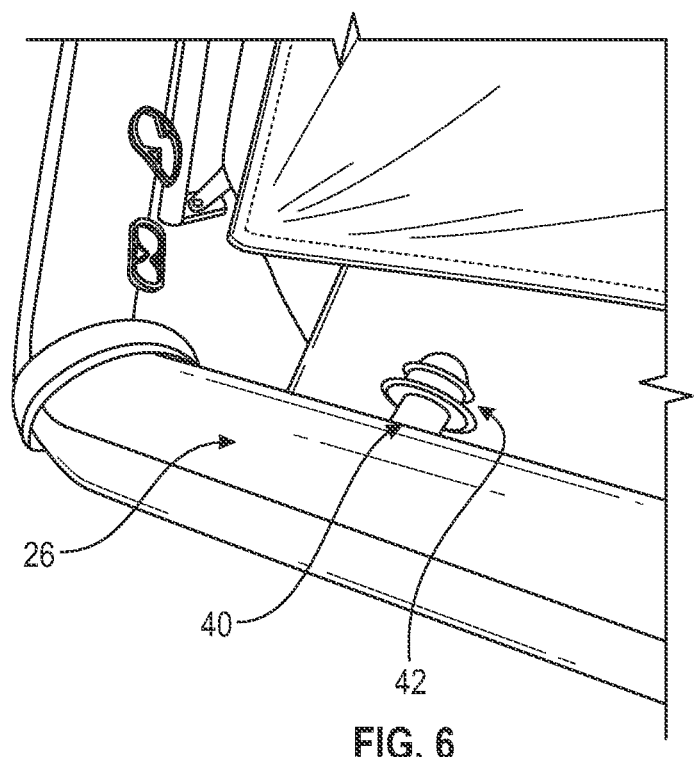
FIG. 6 is a lower side perspective view of the background structure in FIG. 1A, depicting an air-valve with a stopper affixed to a perforation in a section of the three-dimensional lighting structure tube or pole.

The three-dimensional lighting structural components, such as tubes or poles 26, can be constructed with urethane, vinyl, and/or similar material. The exemplary embodiment depicts 4"-6" tubes that can hold between 2 psi and 7 psi of air. Referring to FIG. 6, an air compressor (not shown) can be used to inflate the tubes 26, using a supply hose, and through a perforation 40 within a section of the tubes, wherein an air-valve 42 and stopper are used to seal the perforation. The same air-valve 42 can be used to deflate three-dimensional lighting structure, wherein the structure collapses and can be stored in a carrying case or duffle bag.

With reference to FIGS. 1A-B, and as aforementioned, the base frame can be enclosed within a stretchable fabric that will securely wrap around the inflated tubes using a zip fastener, i.e. zipper affixed on the fabric. Alternatively, the fabric can be secured around the inflated tubes using hook and loop fasteners, e.g., Velcro®, or the fabric can be secured using grommets. Moreover, the positioning of the fabric over the tubes aligns the monochromatic coloring with the back-wall, sidewalls, and first ceiling. The stretchable fabric will remain attached to the frame when the three-dimensional lighting structure is collapsed, wherein the air-valve is accessible through an opening in the fabric.

As such, the configuration of the three-dimensional lighting structure provides a portable, free standing, open-front, and semi-enclosed monochromatic color background that can be positioned behind a subject. The three-dimensional lighting structure can be sized to cover a larger area behind the subject, thereby providing more flexibility in the subject's mobility, as described further below. Moreover, three-dimensional lighting structure can be "Consumerized" such that the average consumer can use the structure in conventional settings, such as a room within a house. The exemplary three-dimensional lighting structure provides a 7'0"× 7'0" monochromatic background, wherein the width is measured between the edges of the two sidewalls 14. The semi-enclosed region is bounded by a 4'0" wide back-wall 12 and 4'5" sidewalls 14 that extend outwardly, providing a depth of 3'5" from the sidewall edges to the back-wall. Moreover, the outermost edge of the overhang ceiling extends 4'0" from the first ceiling.

Figure 7:
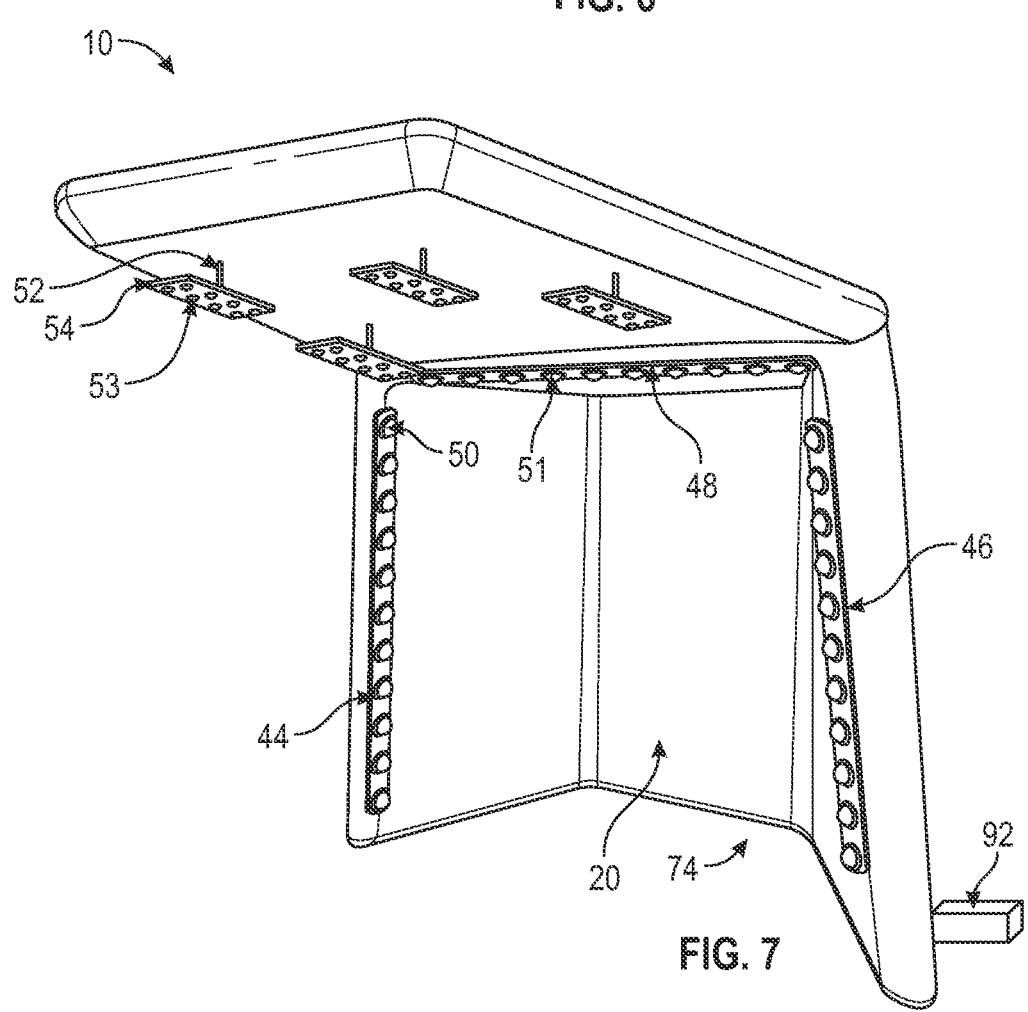
FIG. 7 is a front angled depiction of the background structure in FIG. 1A, depicting a plurality of lighting modules affixed to the structure.
Figure 8A:
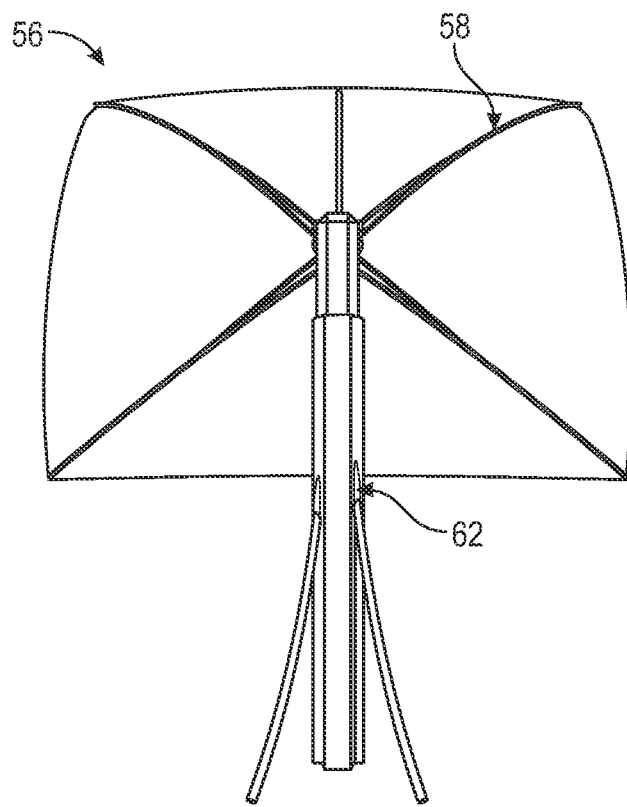
FIG. 8A is a back view of a monochromatic pop-up screen in accordance with the invention, depicting the screen, a plurality of spokes and a central spine.
Figure 8B:
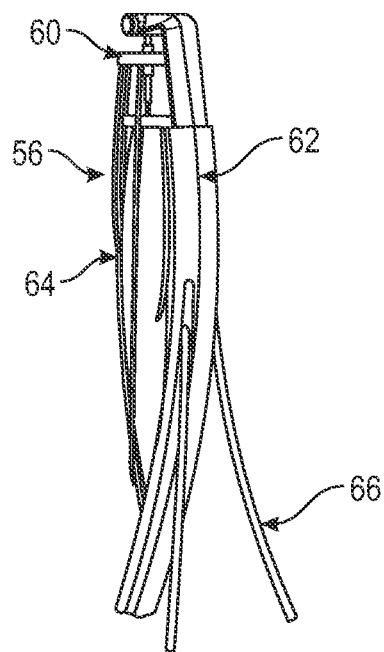
FIG. 8B is a side view of the monochromatic pop-up screen in FIG. 8A, depicting the screen in a closed and folded position.
Figure 8C:
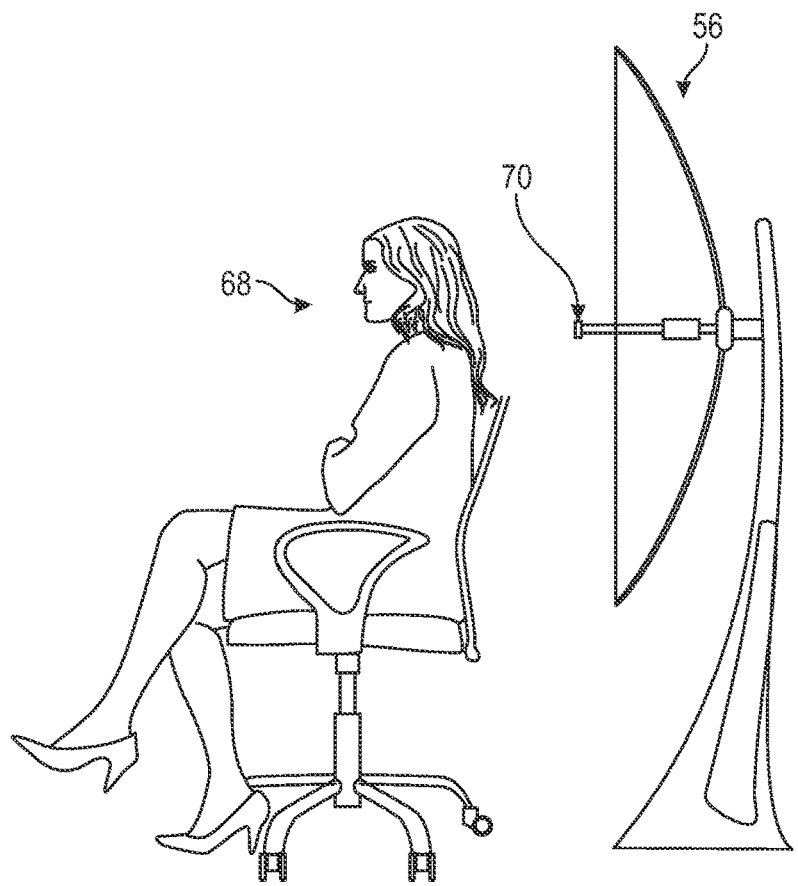
FIG. 8C is a side view of the monochromatic pop-up screen in FIG. 8A, depicting a light cluster extending from an intermediate location on the screen along with an associated subject region.
Figure 8D:
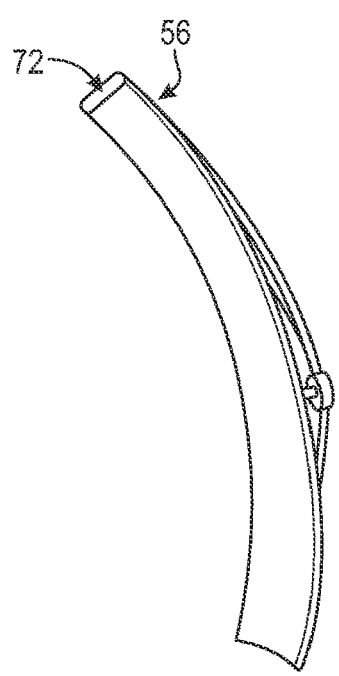
FIG. 8D is a side view of the monochromatic pop-up screen in FIG. 8A, depicting the illuminating light strips along the top of the screen.

Referring now to FIG. 7, the three-dimensional lighting structure 10 can be affixed with a plurality of lighting modules that help provide a uniform light distribution across the monochromatic background 20. The vertical lighting modules 44,46 are solely oriented towards the monochromatic background 20 on the three-dimensional lighting structure 10, and are located along the inner edge of the two sidewalls. The crown lighting module 48 is oriented towards the monochromatic background and an upper portion of a subject region 74. The crown lighting 48 is horizontally positioned along the inner or lower edge of the first ceiling, and is supported by the horizontal tube 30 connecting the two vertical tubes 28 for the embodiment depicted in FIG. 2, and/or the horizontal tube 94 for the embodiment depicted in FIG. 4. Each of the lighting modules 44,46,48 can consist of a plurality of light sources 50,51, such as LEDs. The light sources 50,51 for a respective lighting module 44,46,48 can be attached to a common base, e.g., LED tube light or ribbon lights. Furthermore, the light sources 50 for the vertical lighting modules 44,46 can be configured with a small beam angle, such as 15 degrees, so as to increase the light intensity in smaller focal points on the monochromatic background 20. The light sources 51 for the crown lighting module 48 can be configured with a larger beam angle, such as 45 degrees, so as to increase the illuminating focal point albeit with lower intensity. As such, and as further described below, the plurality of light sources 50,51 enable a targeted illumination of the monochromatic background 20, wherein smaller sections of the background, such as by quadrant, can be specifically illuminated. The vertical lighting modules 44,46 and crown lighting module 48 can be affixed and/or hung from the three-dimensional lighting structure 10 using hook and loop fasteners, e.g. Velcro®, or grommets. Moreover, the vertical lighting modules 44,46 and the crown lighting module 48 can be powered through a direct connection to an external power source, such as wall socket. Alternatively, the vertical lighting module 44,46 and crown lighting module 48 can be powered through connection to an external battery that is in turn connected to a power source, e.g. a Lithium battery. The wiring to the external power source and external battery can be routed beneath the stretchable fabric.

With continued reference to FIG. 7, the three-dimensional lighting structure can further include a plurality of overhang ceiling lighting modules 52 that are oriented towards a location in front of the monochromatic background 20 designated as the subject region 74, so as to enable uniform lighting across the subject and subject region. The overhang ceiling lighting modules 52 are affixed underneath the overhang ceiling, and can be disposed along the interior edge of the overhang ceiling. The overhang ceiling lighting modules 52 can consist of a plurality of LED lights 53. Moreover, the LED lights 53 for each ceiling lighting module 52 can be embodied in a LED panel 54 acting as a light source, wherein each LED panel 54 can be configured to hold a number of LED lights 53. For example, one embodiment of the LED panels may hold ninety (90) LED lights 53. The LED lights 53 can be powered through direct connection to an external power source, such as a wall socket, or through connection to a Lithium battery that is connected to an external power source. The power cables connecting the LED lights 53 to an external power source or a Lithium battery can be run beneath the stretchable fabric. Alternatively, the LED lights 53 can be recharged prior to being affixed to the three-dimensional lighting structure, by using a Lithium battery charger that is connected to the LED lights 53 when stored, thereby negating the need for power cables to connect to the LED lights 53 while in operation on the three-dimensional lighting structure 10. The overhang ceiling lighting modules 52 can be affixed to the three-dimensional lighting structure using hook and loop fasteners, e.g., Velcro®, or grommets.

The vertical lighting modules 44,46, crown lighting module 48, and overhang ceiling lighting modules 52 can employ light sources 50,51,54 that optionally include daylight-balanced lamps and that are flicker free. Other specifications for the light sources include a 96 CRI, and up to 6000 Kelvin color temperature. The overhang ceiling lighting may further enable to the light sources to range between 3000 Tungsten and 6000 Kelvin.

The structure 10 can contain a processor 92 acting as a controller that is in operative communication with each individual light source 50,51,54, wherein each individual light source 50, 51, 54 is hardwire or wirelessly connected to the processor 92 (optionally included in a detachable controller as illustrated). Processor 92 is optionally included within smart device 200 and/or may be configured to execute logic configured to perform any of the functions and/or methods taught herein. Processor 92 can be distributed among multiple devices, such as a detachable controller, a smartphone, a camera, a computing devices, or any combination thereof. As such, the controller is able to adjust the illumination of a specific light source 50,51,54, such as dimming, brightening, and in some cases, changing the color of the given light source. The controller identifies each light source by assigning a specific location data point that corresponds to the physical location of the light source on the three dimensional lighting structure, as determined through the hardwire connection with each individual light source 50,51,54. The controller can be embodied in a separate hardware console 92, and situated on the ground, behind the rear side of the three-dimensional structure. The wiring between the light sources and the controller is located beneath the stretchable fabric. The controller can further contain a wireless transceiver, wherein the controller is in operative communication with an external processor/computing device. With continuing reference to FIG. 7, an exemplary arrangement of the vertical lighting modules includes a Left Vertical Lighting 44, and a Right Vertical Lighting 46. A location data point assignment may include each of the light sources 50,51,54 being individually numbered as 1 through "n" for the corresponding lighting module 44,46,48,52, wherein "n" represents the number of light sources for the given lighting module 44,46,48,52. As such the corresponding location data point may be assigned as follows:

| Light Source Location | Location Data Point |
| --- | --- |
| Optional Right Vertical Lighting, light sources 1 to n | $A_1$ to $A_n$ |
| Overhang Ceiling Lighting, light sources 1 to n | $B_1$ to $B_n$ |
| Optional Left Vertical Lighting, light sources 1 to n | $C_1$ to $C_n$ |
| Crown Lighting, light sources 1 to n | $D_1$ to $D_n$ |

As further described below, the controller on the three-dimensional lighting structure will receive instructions from an external processor/computing device to adjust the illumination of specific light sources in order to correct for imperfections in color neutrality across the monochromatic background.

In various embodiments, processor 92 is configured to identify imperfect pixels entering the Chroma key algorithm and use machine learning to correct imperfections in the monochromatic key. (Imperfection referring to pixels that do not display the monochromatic key or other distinguishing characteristics correctly.) Optionally, processor 92 is configured to identify imperfect pixels entering the Chroma key algorithm and use human segmentation to correct imperfections in the monochromatic key. Optionally, the processor is configured to manually or automatically re-size the replacement and/or subject images, video or computer-generated background to fit the size of the subject. Optionally, processor 92 is configured to identify imperfect pixels entering the Chroma key algorithm and use human segmentation in combination with machine learning and artificial intelligence to correct imperfections in the monochromatic key in real-time. In some embodiments, processor 92 is configured to automatically watermark images visibly or invisibly, optionally using a blockchain to track copyright information, sharing, distribution, commerce, revenue, registration, payments, play counts, any other valuable information, and/or the like. In some embodiments, processor 92 is configured to detect a watermark in an image (e.g., a background image) and use the image for Chroma key compositing responsive to the presence of the watermark. For example, blocking compositing having unlicensed or otherwise unallowed watermarks; or requiring a specific watermark before performing specific Chroma Key compositing functions. In a specific example, processor 92 may be configured to prevent use of images as background images if the images have a specific watermark and/or other source identifier.

With reference now to FIGS. 8A-D, an alternative embodiment of a background structure is depicted using a monochromatic color pop-up screen 56. The screen 56 can be deployed in an umbrella manner from a stored position, wherein the screen is affixed to a plurality of spokes 58 that attach to a screen shaft 60. The spokes 58 can open the screen 56 through spring action or electric automation. The screen shaft 60 is rotatably affixed to a central spine 62, enabling a closed screen to be folded 64 and aligned with the central spine axis 62, thereby providing a compact storing position. The central spine can be placed upright using two support legs 66. The central spine is telescoping and extendable, thereby providing the screen 56 with an adjustable height, enabling the screen 56 to be positioned on a desktop or on the floor.

As aforementioned, the screen 56 is typically constructed with a monochromatic color, which is typically blue or green, but can also be any monochromatic color or other distinguishable characteristic that distinguishes screen 56 from the subject. The screen itself, when fully opened, is sized to provide a monochromatic background generally tailored for an upper portion 68 of a subject, such as upwards from the mid-torso of a person, e.g., a person sitting at a desk. The exemplary embodiment includes a screen size that is 4'×4'. The screen 56 is further disposed with a light cluster 70 that extends from an intermediate location on the screen 56, wherein the light cluster 70 helps provide a uniform light distribution across the monochromatic background. The light cluster 70 is positioned on the screen 56 where it will be covered by the subject, when viewed from a camera in front of the subject, to prevent interference with a captured image/video because of the illuminating light cluster 70. Moreover, illuminating strips 72 can be placed along the top of the screen 56 for additional lighting across the monochromatic background. The illuminating strips 72 are powered by a rechargeable Lithium battery located with the illuminating strips, or wired power using household 110v AC.

While the examples discussed herein include embodiments in which screen 56 is distinguished by a monochromatic color, in alternative embodiments, other methods and/or characteristics are used to distinguish screen 56, or any other surface, from a subject. These characteristics include surfaces having a regular identifiable pattern and/or a watermark. For example, screen 56 may include a checkerboard pattern of slightly different colors, e.g., different shades of green or blue. This pattern may be used to identify the specific surface as one on which an alternative image should be overlaid within the camera, e.g., remote camera 220 or a camera included in smart device 200. In some embodiments, different distinguishing characteristics are used to identify different surfaces within an image. For example, a first surface may include a square checkerboard of two shades of green and a second surface may include just one shade of green or a diamond checkerboard. The first and second surfaces may then be subject to different pixel overlays. Specifically, the first surface may be given an overlay of a background behind a subject while the second surface may be given a different overlay of a foreground in front of or beside the subject. More than two surfaces may be distinguished using this approach. A wide number of different patterns may be used. In a practical application, camera 220 is configured for a user to "read" a surface by imaging the surface and assigning the pattern detected as a characteristic of a simulated "greenscreen" within the camera 220. The user can then assign a particular image overlay to that pattern. This process can be repeated for several patterns at once.

In some embodiments, depth of field is used to distinguish the subject from surfaces such as screen 56. In such embodiments a user interface may be used to select one or more depths (of field) to make such distinctions. For example, the user interface may be used to indicate that objects within 3 meters (of the camera 220) should be treated as subject and objects further then 3 meters should be treated as surfaces on which Chroma key compositing (e.g., image modifications) may be applied as discussed herein. The user interface may include an input configured for a user to dynamically select the one or more depths while watching the results on a screen in real-time. In this approach the user can customize the depth visually to optimize the resulting composite image. More than one depth may be used. For example, objects within 5 meters may be subject to a first Chroma key compositing, objects within 5-7 meters may be considered subject, and objects further than 7 meters from the camera may be subject to a second Chroma key compositing.

In alternative embodiments, surfaces are distinguished by how they are illuminated rather than, or in addition to, a characteristic of the surface. In these embodiments a characteristic of the illumination light is used to distinguish specific surfaces. Such illumination characteristics can include, for example, a wavelength of light, the profile of a light's spectrum, a frequency of variation in light intensity, and/or the like. In one specific embodiment, light cluster 70 includes a strong sodium line and/or a strong intensity in the infrared, while illuminating strips 72 to not include this spectral characteristic. The differences in spectra between the two light sources may then be used to distinguish a subject from a surface such as screen 56 when the subject and surface are illuminated by the sources of different characteristics. In another specific embodiment, a first light source is pulsed at first frequency (e.g., 60 Hz) while a second light sources is continuous or pulsed at a different frequency, e.g., 90 or 120 Hz. Optionally, the pulse frequency is at which camera 220 can detect the intensity variation, but at a frequency that is not detectable by a human eye and/or at a frequency greater than (e.g., at least 1.5, 2 or 3 times greater) the frame rate of the resulting video. As such, the variation in lighting intensity is not visible to a person in the resulting video. A wide range of alternative pulse frequencies may be used in various embodiments. In some embodiments a lighting source includes a visible or infrared laser configured to raster over a surface. The laser may raster over the surface at a speed fast enough so as not to be visible to the human eye, and/or be of a wavelength invisible to the human eye.

The illumination characteristic may or may not be detectable to a person's naked eye. For example, the illumination characteristic may be outside of the visible wavelengths detectable by the human eye and/or may include an intensity variation at a frequency greater than that detectable by the human eye. Note that an intensity variation need not be completely ON and OFF. In various embodiments, the variation may be less than 10, 20, 30, 50 or 70%, or any range therebetween. Intensity variation can include an infrared and/or visible component whose intensity is varied at any frequency detectable using camera 220, e.g., at least 1, 5, 10, 30, 60, 90 or 120 Hz or any range there between.

Embodiment of the invention can include any combination of the characteristics/methods of distinguishing between surfaces and/or subject(s) discussed herein. Any of the lighting sources discussed herein may include the distinguishing characteristics discussed herein. For example, screen 56 may be distinguished by a checkerboard of slightly different shades of green, while a subject is distinguished by illumination including a stronger infrared component relative to illumination of screen 56, and an object in the foreground may be distinguished by a third light source whose intensity varies 25% at 60 Hz. In embodiments that use illumination to distinguish a subject, screen 56 and/or lighting structure 10 are optional. For example, if the subject is positioned in an open area illuminated by sunlight and the subject is illuminated by a light source having any of the distinguishing characteristics discussed herein, the illumination can be used to distinguish the subject from their surroundings and thus the subject and/or surroundings may be replaced by alternative images as discussed herein. This replacement can occur in camera 220 or in post processing. Camera 220 is optionally part of Smart Device 200.

The screen 56 further contains a processor (not shown) acting as a controller, that is in operative communication with each light source, namely the light cluster 70 and illuminating strips 72, through a hardwire connection. As such, the processor (controller) is able to adjust the illumination of a specific light source 70,72, such as dimming, brightening, and in some cases, changing the color of the given light source. The controller identifies each light source 70,72 by assigning a specific location data point that corresponds to the physical location of the light source on the screen, as determined through the hardwire connection with each individual light source 70,72. The controller can be situated behind or below the screen. The controller can further contain a wireless transceiver, wherein the controller is in operative communication with an external processor/computing device. As further described below, and similar to a three-dimensional lighting structure 10, the controller on the screen will receive instructions from an external processor/computing device to adjust the illumination of specific light sources in order to correct for imperfections in color neutrality across the monochromatic background.

Subject Region. The subject region is a designated area wherein the subject of an image/video being captured will be situated between a camera and a background. Chroma key compositing typically requires the subject to be positioned where the camera is able to focus on the subject with a desired zoom while ensuring the background consists entirely of a monochromatic color. As such, the flexibility in a subject's location, stance, and mobility is dependent on the background structure employed. Referring now to FIGS. 1A-B and 7, the three-dimensional lighting structure 10 provides a 7'×7' monochromatic background 20 from the ground up, thereby enabling a subject's full body to be captured. A subject can also freely move about within the semi-enclosed monochromatic region 74. Moreover, multiple subjects can be captured in a camera shot while being situated within the subject region 74, thereby diversifying the types of images/videos that can be Chroma key composited. As aforementioned, the affixed crown lighting module 48 and overhang ceiling lighting modules 52 on the three-dimensional lighting structure 10 will illuminate the subject, even if the camera and any other associated light sources are unable to adequately do so. By contrast, referring now to FIG. 8C, the subject region 68 is more restrictive when located in front of a pop-up monochromatic screen 56 wherein the camera is typically focused on the mid-torso upwards of a single subject. Considering the camera shot is limited by the spatial boundaries of the monochromatic screen 56, the subject region 68 is typically situated near to the monochromatic screen 56, thereby facilitating a Chroma key compositing process with minimal space requirements.

Figure 9:
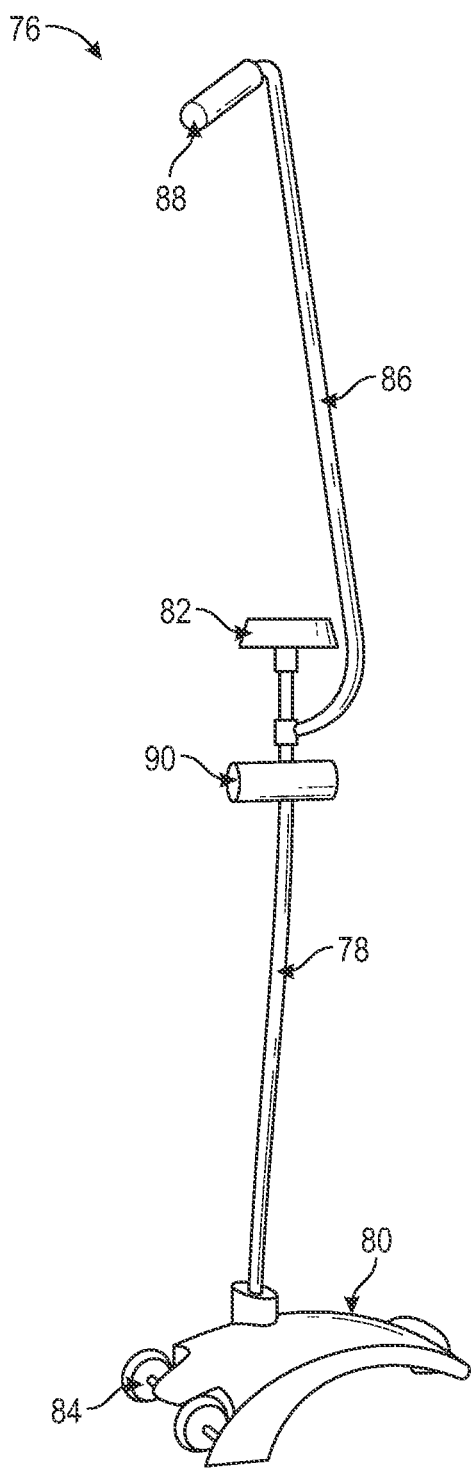
FIG. 9 is a front view of a rolling frame in accordance with the invention, depicting a wheelbase, spine, device mount, light stand and light bar, and a separate lighting module.

Remote Controlled Camera Positioning. With reference now to FIG. 9, an alternative embodiment to positioning a camera is depicted, wherein conventional positioning can be any means that enable the camera to adequately focus on a subject, such as hand-held positioning, placing the camera in a stand, or using the third vertical tube of the aforementioned three-dimensional lighting structure. In the alternative embodiment, a smart device with a camera (not shown) can be secured to a rolling frame 76 that can be remotely controlled to "block" the shot, which as aforementioned is the positioning of the camera to obtain a desired camera shot of the subject. The rolling frame 76 comprises of a frame spine 78 rotatably attached to a frame base 80, wherein a smart device can be secured to the frame spine 76 through a universal smart device mount 82. The frame base 80 can be equipped with wheels 84, or other means for moving the rolling frame 76. The frame base 80 can also contain a motor (not shown) that can move the rolling frame 76 forward and backward, and in an exemplary embodiment, the motor can steer wheels 84 affixed to the wheelbase 80. The rolling frame also contains a GPS receiver, which, along with the motor, is in operative communication with a second smart device. Using the second smart device, the rolling frame can be moved through remote control, via the motor and GPS receiver, to position the camera for optimal "blocking".

The rolling frame 76 can further include a light stand 86 that will extend from the frame spine 78 to a location above the universal device mount 82. The light stand 86 is affixed with a light bar 88 that can illuminate the subject while an image/video is being captured. The exemplary embodiment includes a light bar 88 that is 5"-7" wide. Moreover, a central lighting module 90 is located underneath the universal smart device mount 82 to further illuminate the subject.

The light stand 86 is rotatably attached to the frame spine 78, enabling the light stand 86 to be rotated downwards when storing the rolling frame 76. Moreover, the frame spine 78 can be folded to align with the frame base 80 to facilitate a compact storing configuration.

Chroma key Compositing Process. With reference to FIG. 10, there is shown a Chroma key compositing system that provides a platform to capture an image/video of a subject disposed in front of a monochromatic color background, and simultaneously composite the image/video with the background replacement content, while removing visibility of the monochromatic color to reveal the background replacement content as located behind the subject. The system can be further configured to address any lighting imperfections affecting color neutrality of the background. Moreover, the system can provide a platform to edit background replacement content located on a cloud server, and sync such content to the system such that background replacement content can either be played back or streamed during the Chroma key compositing process.

As aforementioned, the system, as a base configuration, comprises of hardware components that include a monochromatic background structure, a smart device, and a camera. The smart device 200 can be a smartphone or other personal computing device with wireless connectivity capability. A software application is embedded with the smart device, and acts as the system platform 202, enabling the initiation and control of the Chroma key compositing process. The software application will further use a smart device display screen to display and facilitate the Chroma key compositing process. A camera can be located on the smart device 200 itself, wherein the system platform 202 enables access to the camera functionalities. Alternatively, a remote camera 220 can be used, wherein the remote camera 220 can be located in a second smart device, or as a standalone higher quality camera, and the remote camera 220 is further in operative communication with the system platform 202. The system may also include a background structure controller 218, and further enable communication with remote servers via the network 204. System platform 202 optionally includes logic configured to be executed by processor 92, and/or a processor within remote camera 220, smart device 200, background structure processor 218, and/or the like.

Figure 11:
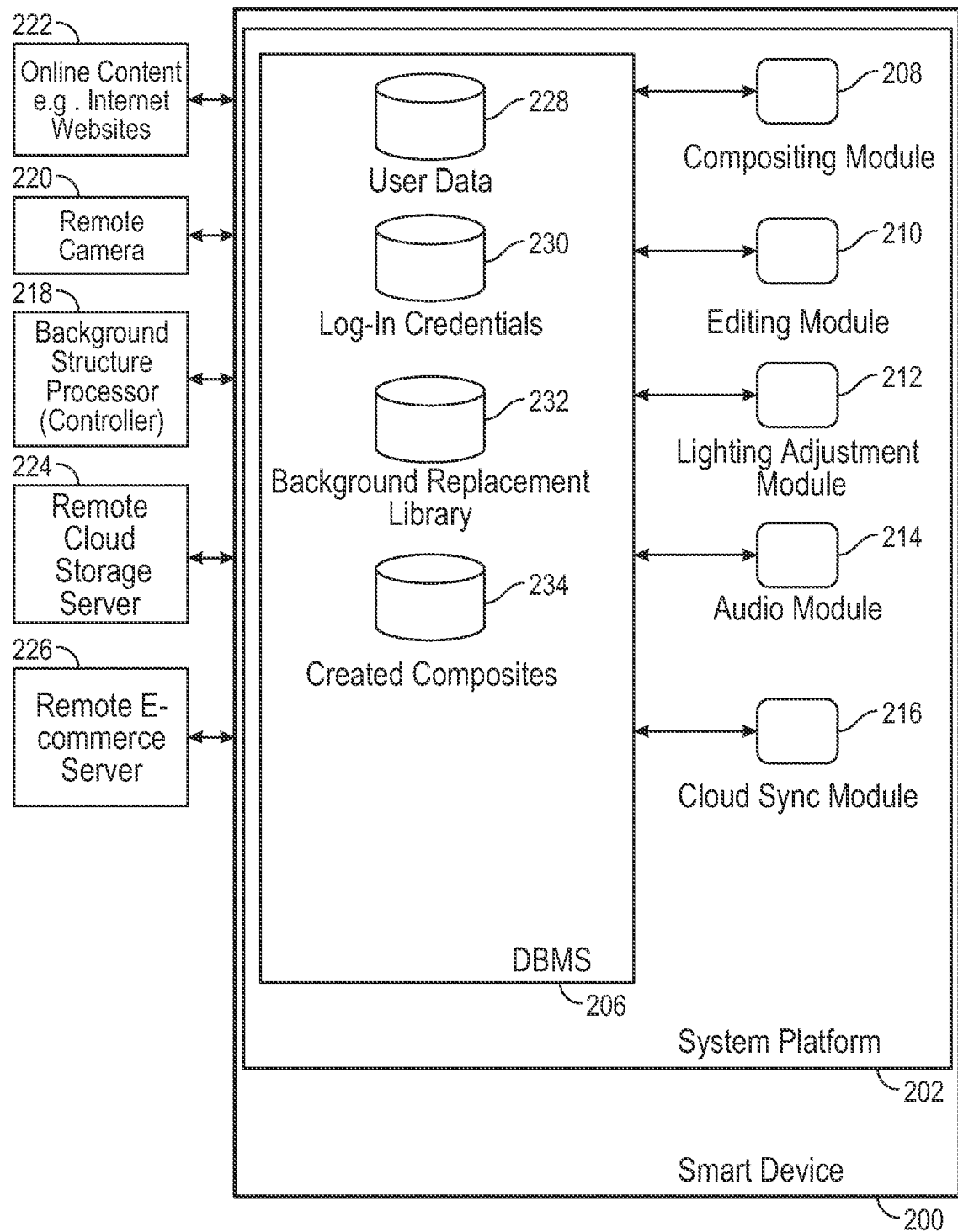
FIG. 11 depicts a simplified block diagram of a database management system (DBMS) of the system in FIG. 10.

With reference to FIGS. 10-11, the system platform 202 includes a database management system (DBMS) 206 that maintains detailed data relating to user information 228, log in credentials 230, a background replacement library 232, and created composites 234. The user information data 228 and login credentials data 230 pertain to a profile for a specific user, and include information such as name, organization, username, and passwords for access to a remote server. The background replacements library data 232 contains background replacement content that have been stored onto the smart device, such as on a camera roll, and can be accessed for layering a given image/video being captured on top, i.e. creating a Chroma key composite. Background replacement content can be 1) created by a user; 2) obtained/purchased through a remote exchange server; 3) obtained from previously stored background replacement content located on the camera roll or cloud-based server; and/or 4) obtained through available background replacement content over the internet. Moreover, the cloud-based server 224 enables background replacement content of uncommon image/video formats to be transcoded to a common format that is suitable for the system platform 202. The created composites data 234 stores Chroma key composites created by the system platform 202, wherein said created composites can be distributed or uploaded to a remote sever, including the internet. The system platform 202 further includes a compositing module 208, an editing module 210, a lighting adjustment module 212, an audio module 214, and a cloud sync module 216.

Figure 12:
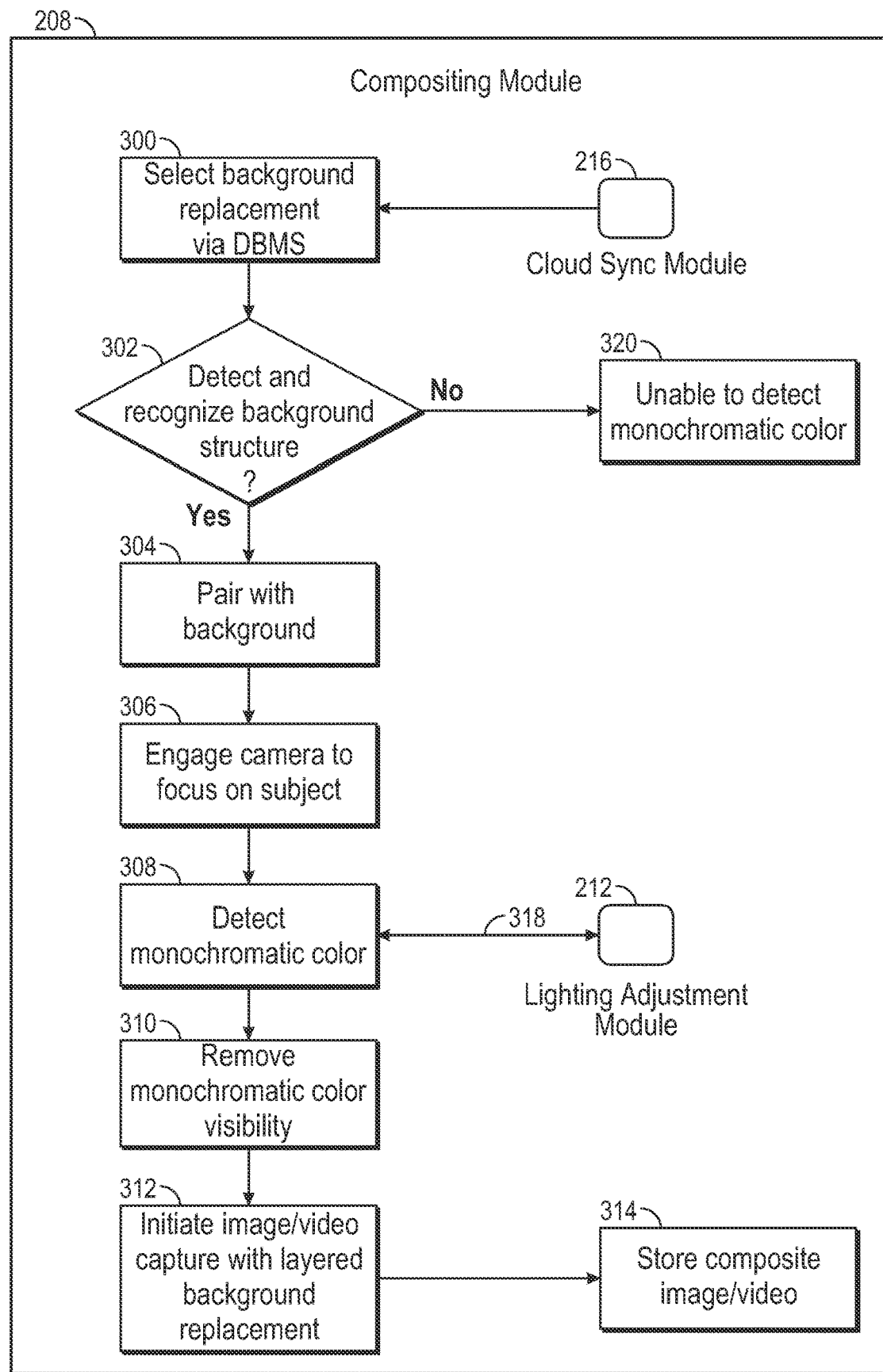
FIG. 12 depicts a flowchart for the compositing module operation of the system in FIG. 10.

Creating a Chroma Key Composite. With reference to FIG. 12, there is shown a method and exemplary operational flowchart of the compositing module 208, which provides a platform to layer an image/video of a subject being captured over a desired background replacement. The compositing module 208 will first prompt a user to select 300 a background replacement image/video from the DBMS to be layered and played back behind the image/video of the subject in real-time. A selected video may be playback in it is entirety or may be truncated, and can further be looped based on a desired length by the user. Alternatively, as further described below, a background replacement video may be streamed from a cloud server, as opposed to being played back from the DBMS, using the cloud sync module 216. Once a background replacement content has been selected, the compositing module 208 searches 302 for a monochromatic background structure to pair/connect. The pair/connection 304 can be accomplished through wireless pairing, for e.g. through a Bluetooth® connection, or connecting over a wireless network. If a pair/connection is unable to be established, the compositing module 208 will be unable 320 to determine the monochromatic color to create a Chroma key composite. The compositing module 208 can enable an "unlock code" to be purchased via the network (not shown), such that the compositing module 208 can still create a Chroma key composite, however the exact monochromatic color may not be discernible, thereby potentially rendering a Chroma key composite image/video of sub-par quality.

Figure 16A:
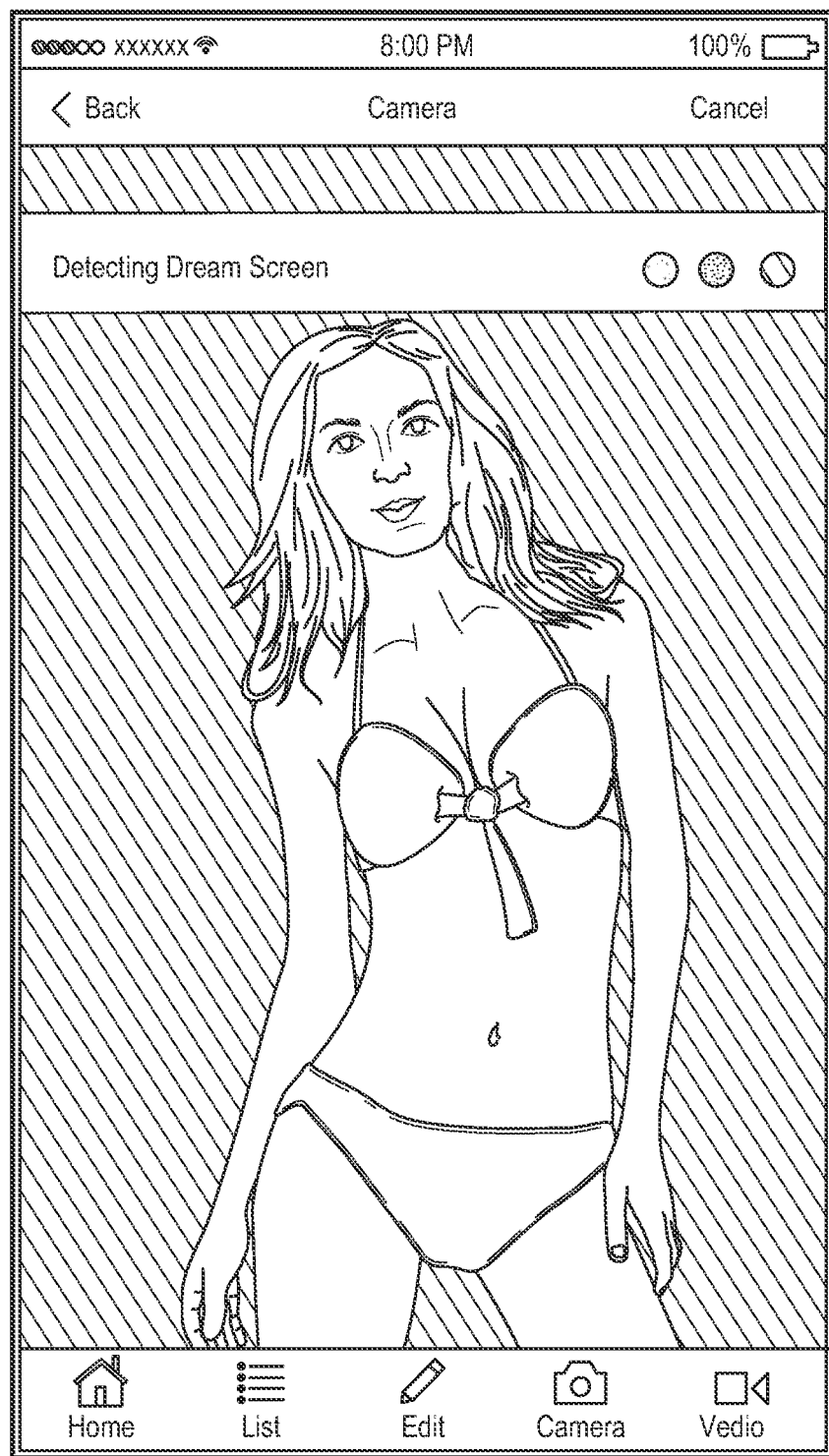
FIG. 16A depicts a screenshot of the compositing module in FIG. 12, depicting a camera shot with a subject in front of a monochromatic background.
Figure 16B:
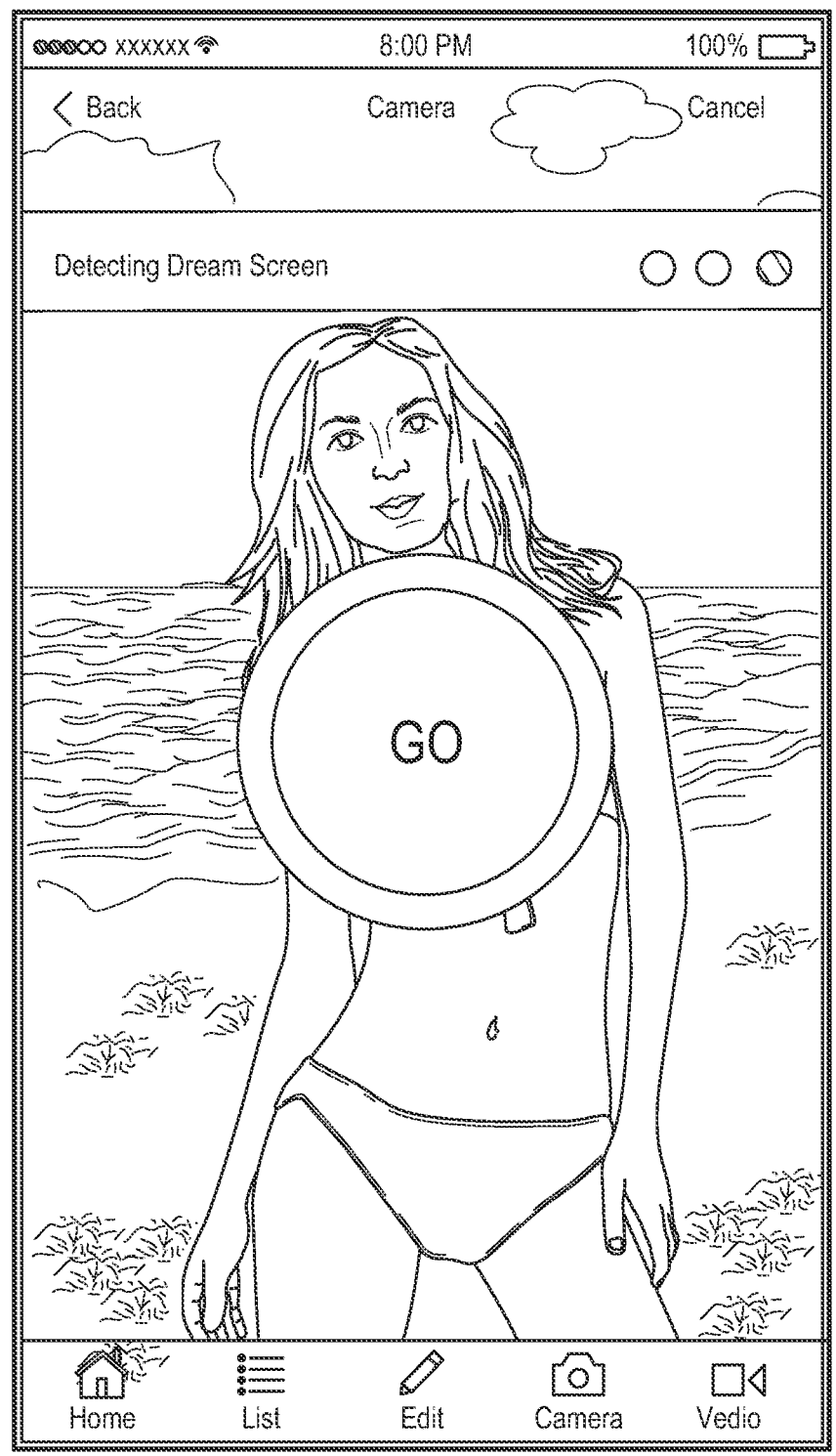
FIG. 16B depicts a screenshot of the compositing module in FIG. 12, depicting a camera shot with a background replacement image/video layered with a subject.

Once a monochromatic background has been paired 304, the system platform will obtain relevant information from the background structure such as the pre-defined monochromatic color or other distinguishing feature employed, e.g., Green #255 or a checkerboard, and a pre-mapped location grid that the lighting adjustment module 212 can use to identify and pinpoint lighting location on the background structure, as further described below. The compositing module 208 will subsequently engage 306 the camera to focus on a subject located in a specified subject region that is disposed in front of the monochromatic background. The subsequent camera shot will be superimposed upon the selected background replacement content. Once the camera has the subject within the camera shot, the composite module 208 will search and detect 308 the presence of the pre-defined monochromatic color that fills up the background in the camera shot (see also FIG. 16A). As further described below, if a background structure is equipped with a controller facilitating lighting adjustment, the lighting adjustment module 212 will be accessed 318 to help ensure a uniform light distribution is imposed on the monochromatic color background. Once the composite module 208 has detected the monochromatic color presence, the compositing module 208 will essentially remove the visibility 310 of any presence of the monochromatic color in the camera shot, thereby revealing the selected background replacement content that is located behind the area where the monochromatic color was located (see also FIG. 16B). In a detailed embodiment, the compositing module 208 contains an editing component with a slider (not shown) that enables the background replacement content to be blurred so as to add the appearance of "depth" between the subject and the location that the subject appears to be in through background replacement.

In some embodiments, parts of an image (e.g., subject and background) are determined as being illuminated by certain light sources automatically. For example, the processor may be configured to execute an "identify light sources" routine in which the intensity and/or of each light source is varied and the results observed in real-time in image(s) captured using the camera. As a particular light source is varied, those pixels that change in correlation with the light source variation are identified. The light source can then be identified as illuminating those particular pixels. This identification can be associated with a (yes/no) Boolean value or a scalar value. Thus, a particular light source may be identified as contributing 10% to the lighting of one pixel and 80% to the lighting of another pixel.

Figure 16C:
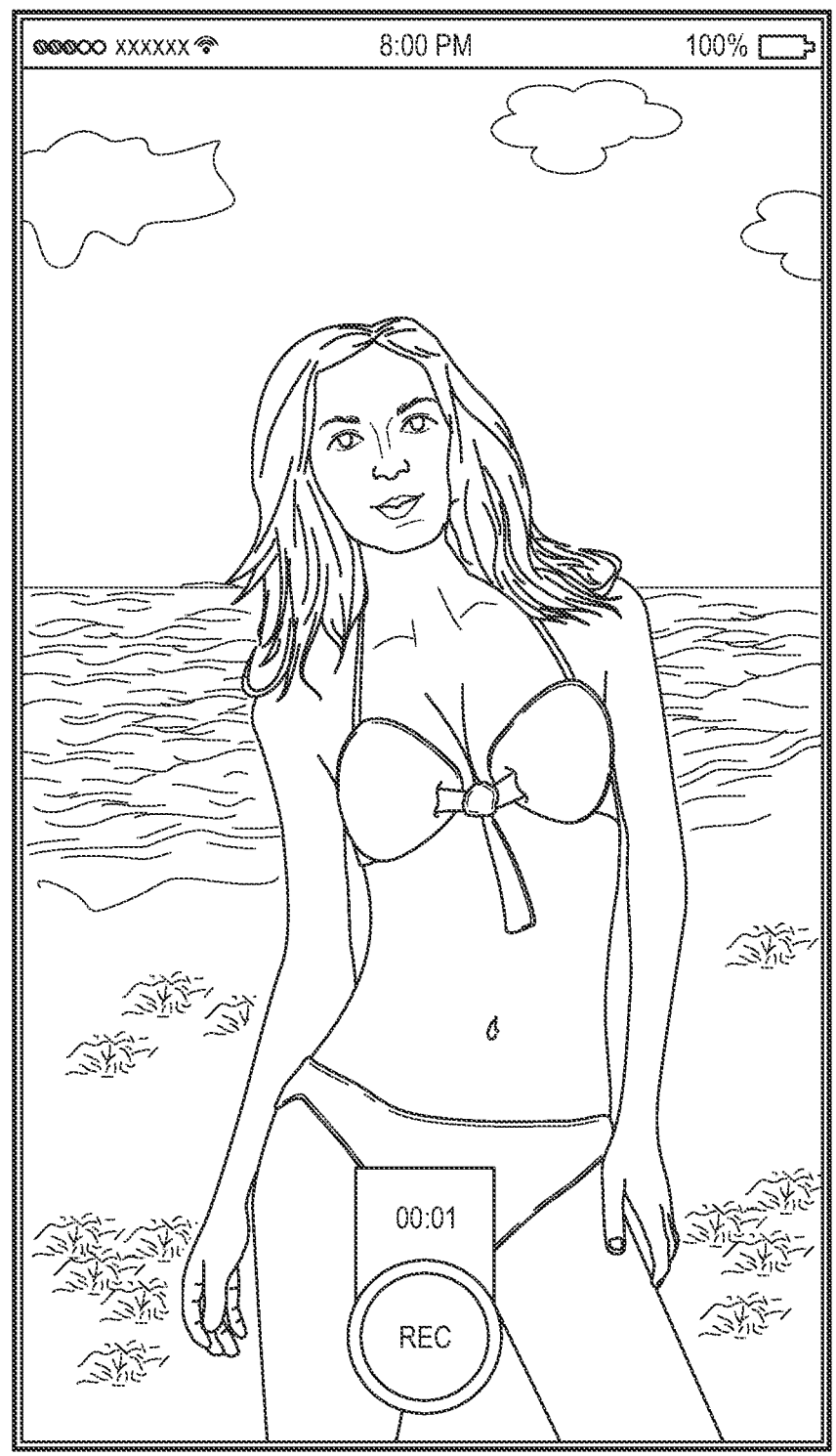
FIG. 16C depicts a screenshot of the compositing module in FIG. 12, depicting a video of a subject being captured that is layered with a background replacement image/video layered.

The compositing module 208 subsequently enables the image/video of the subject with the background replacement content to be captured 312 (see also FIG. 16C). The created composite will be stored 314 in the DBMS for future access. In an alternative embodiment (not shown), the composite module 208 can enable a composite image/video to be captured and uploaded simultaneously to a server for viewing, i.e. live streaming of the image/video with the layered background replacement content composited.

Automated Lighting Adjustment. Referring now to FIGS. 10-11, a Chroma key compositing system can further include a controller 218 in operative communication with the system platform 202 and lighting modules affixed to a monochromatic background structure, enabling automated lighting adjustment of the said lighting modules. An example of a background structure with such communication capability is the aforementioned three-dimensional lighting structure 10 (FIGS. 1A-B, 7), and pop-up screen 56 (FIGS. 8A-D), both embedded with a processor (controller) and wireless transceiver. The controller 218 can be equipped with a plurality of wired data input ports, and wireless data input ports that connect over a wireless network or wireless pairing, for e.g. Bluetooth® pairing. The controller 222 can be wirelessly connected to the smart device 200, and thereby connected to the system platform 202.

Figure 1C:
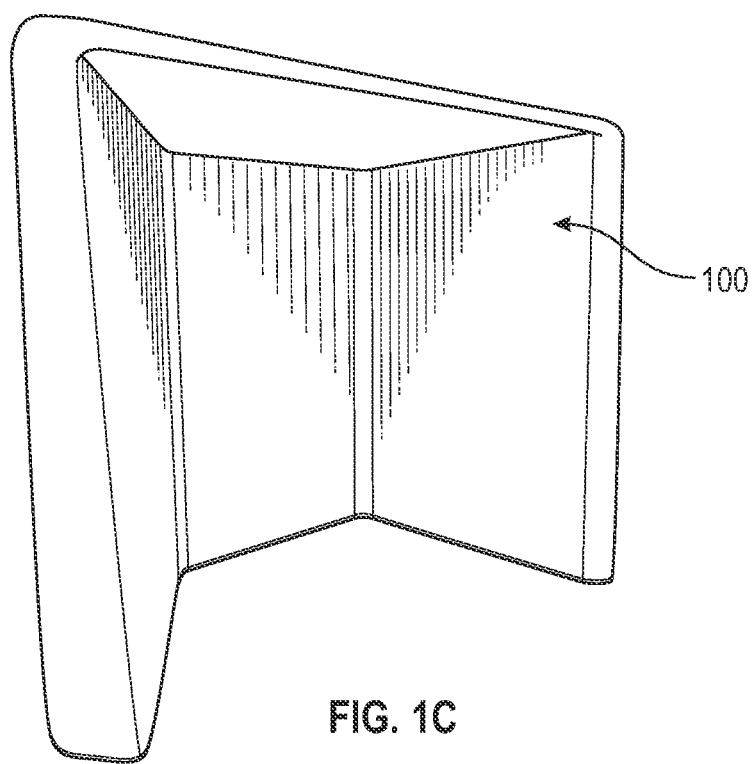
FIG. 1C depicts a front side view of the background structure in FIG. 1A, depicting shadows cast on the exterior surface of the monochromatic background.
Figure 13:
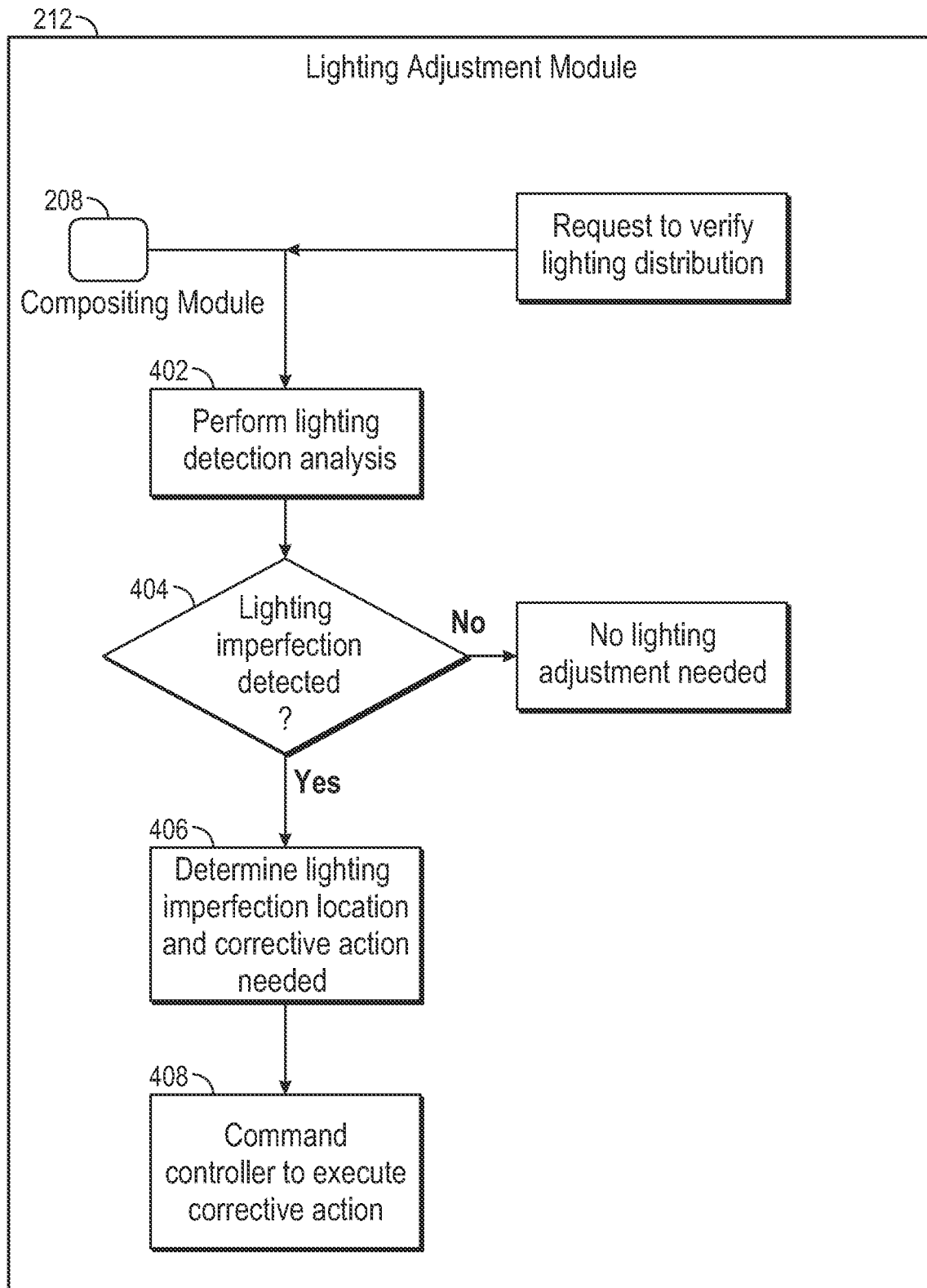
FIG. 13 depicts a flowchart for the lighting adjustment module operation of the system in FIG. 10

With reference now to FIG. 13, there is shown a method and an exemplary operational flowchart of the lighting adjustment module 212 for automatically correcting any lighting imperfections imposed on the monochromatic color background after it is first paired with the compositing module 208. Once the camera has detected the monochromatic color in the background structure (FIG. 12 step 308), the lighting adjustment module 212 will engage the camera to perform 402 a lighting detection analysis on the monochromatic background to determine if any lighting imperfections, or non-uniform lighting, is detected on the monochromatic background, thereby impeding color neutrality. Such lighting imperfections or non-uniform lighting can be due to shadows cast from exterior objects (see also FIG. 1C, reference character 100), hotspots created by any lighting source, and/or other factors leading to an uneven lighting distribution. The lighting detection analysis uses a pixel color-pattern recognition algorithm wherein the camera will determine if the pre-defined monochromatic color, for e.g. Green #255, is uniformly displayed in the background structure. Using Green #255 as the exemplary monochromatic color, the pattern recognition algorithm will detect 404 any shades of green that are darker or lighter than Green #255 located on the background structure. A darker shade would correspond to a shadow being present in that specific location, while a lighter shade would correspond to a hotspot being present in that location. The lighting adjustment module 212 will subsequently assign a location 406 for each shadow or hotspot found using the physical spatial boundaries of the background structure, and identify an area within the background wherein the specific shadow or hotspot is located. The pre-mapped location grid that corresponds to the paired background structure will divide the background structure into equally sized areas, such as in quadrants, and associate the location data points of the light sources on the background structure with a corresponding area. As such, the lighting adjustment module will associate a given lighting imperfection location with a specified area, and thereby determine the respective light sources on the background structure that need to be adjusted.

The lighting adjustment module will subsequently determine 406 the corrective action needed to correct the lighting imperfection. Such corrective action can include changing color, dimming, or brightening the illumination on a given region of the background structure.

The lighting adjustment module can also subsequently determine 406 the corrective action needed to correct the lighting imperfection. In some embodiments the camera can make corrective action 408 including changing the imperfect pixels to the perfect or correct pixel as it enters the Chroma key algorithm 408 of the compositing module.

The lighting adjustment module 212 will command 408 the controller to direct the light sources associated with the identified lighting imperfection area to execute the corrective action. As aforementioned, the background structure controller can identify each light source with a specific data location through a hardwired connection. The lighting adjustment module 212 will perform said lighting detection analysis and lighting adjustment optimization when the system platform 202 is launched or re-launched. The lighting adjustment module 212 may also be executed if requested via the system platform 202.

Additionally, the lighting adjustment module 212 can adjust lighting on the three-dimensional lighting structure that is focused on a subject region. An example of this lighting is the overhang ceiling lighting modules 52 for the three-dimensional lighting structure 10 depicted in FIG. 7. The lighting adjustment module 212 can adjust such subject region lighting based on different ambient conditions, such as due to different lighting during the day and at night, or in a brightly lit television studio. Such subject region lighting can be configured with presets that are controlled by the lighting adjustment module, which can include low light, medium light, or nighttime.

Figure 17A:
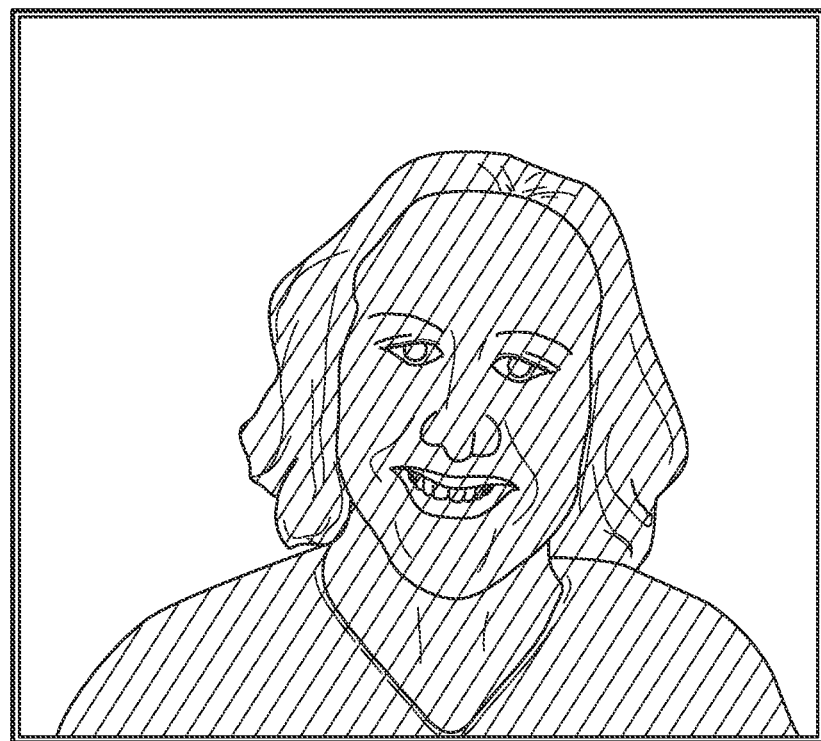
FIG. 17A depicts a Chroma key composite created without lighting adjustment applied, thereby resulting in lighting imperfections on the background.
Figure 17B:
FIG. 17B depicts a Chroma key composite created with lighting adjustment applied to create a well-lit background.

Referring to FIG. 17A, there is shown a Chroma key composite created without proper lights or lighting adjustment, thereby an unnatural, negative photographic effect is imposed due to the lack of lighting as well as lighting imperfections on the subject, whereas FIG. 17B depicts a composite with lighting adjustment applied to obtain a well-lit background with a properly lit subject.

In addition to the lighting detection analysis described above the lighting adjustment module 212 can enable fine-tuning (not shown) of the perceived color neutrality achieved through lighting adjustment, by substituting those pixels identified by the lighting adjustment module 212 as different from the pre-defined monochromatic color, with pixels of the pre-defined monochromatic color. An example of this application can be where color neutrality is unattainable in a small section of an aforementioned region, even with lighting adjustment, and thus the pixel substitution process will target the small section to ensure the entire background displays the pre-defined monochromatic color, thereby providing a sharp, high-definition viewing of the background replacement content. The pixel substitution process will detect the different shades of a monochromatic color that are present, wherein the different shades correspond to a scale defined for the given color. For example, where Green #255 represents the pre-defined monochromatic color, and the lighting adjustment module detects a small location of Green #450 in the camera shot, the lighting adjustment module will execute a command to substitute Green #450 pixels, as visible through the smart device display, with the green #255 pixels. This pixel substitution process can occur just prior to the background replacement content being made visible, and/or nearly simultaneous with the lighting detection analysis process.

In an alternative embodiment, a depth of field analysis (not shown) can be performed either in conjunction with or in place of the lighting detection analysis. The system 202 will engage the camera in a manner such that the subject in the camera shot will be in-focus while the background will be out-of-focus, thereby showing a subject that is clear while a background that may appear somewhat blurry, similar to a process accomplished by cameras equipped with F-stop settings. As such, the system will use depth of field data points as determined by the camera, to identify those pixels that are out-of-focus and replace them with a selected background replacement.

Audio Mixing. The audio module 214 provides a platform for mixing the various audio inputs received for a captured image/video, which can be in addition to audio recorded simultaneous with the captured image/video, such as from a microphone worn by the subject. As aforementioned, the controller can be wired or wirelessly connected to a plurality of audio providing devices. Such devices can include a wireless microphone located on a subject of whose image/video is being captured. Other devices include auxiliary devices such as a musical instrument, or Karaoke machine.

The audio module 214 will receive audio data from the controller, and enable the one or more audio sources to be selectively mixed and distributed with the captured/capturing image/video. The audio module can also prompt for additional audio editing that include, among others, truncating the audio input(s), and specifying a truncated portion to be looped. As such the audio module 214 enables a user to determine how the various audio inputs will be integrated with the image/video being captured. The selected audio mixing and distribution will be stored and overlaid as replacement audio if desired with created composite.

Editing Background Replacement Content. The editing module 210 enables background replacement content to be edited using the smart device 200 or using features available on the cloud server. Content edited on the cloud server will be stored to the smart device through the cloud sync module 216, as described below. Using features available on the cloud server, the editing module enables background replacement files of uncommon file formats to be transcoded into common file formats suitable for the system platform 202. Additionally, using features on the cloud server, the editing module 210 enables the background replacement content to be made blurry such that when composited with an image/video of a subject, the blurriness of the background replacement content creates a depth effect to the content. This depth effect process replicates content created by a person skilled in the art of portrait photography by using an F-stop on a 35 MM camera to make a portrait of a clear, in-focus subject with a blurry background. Additionally, Chroma key composites created on a smart device can be synced to a cloud server for automated post-production video assembly, such as professionally made show introductions or introductory credits with a logo, and then synced back to the smart device for continued editing or publication.

Figure 14:
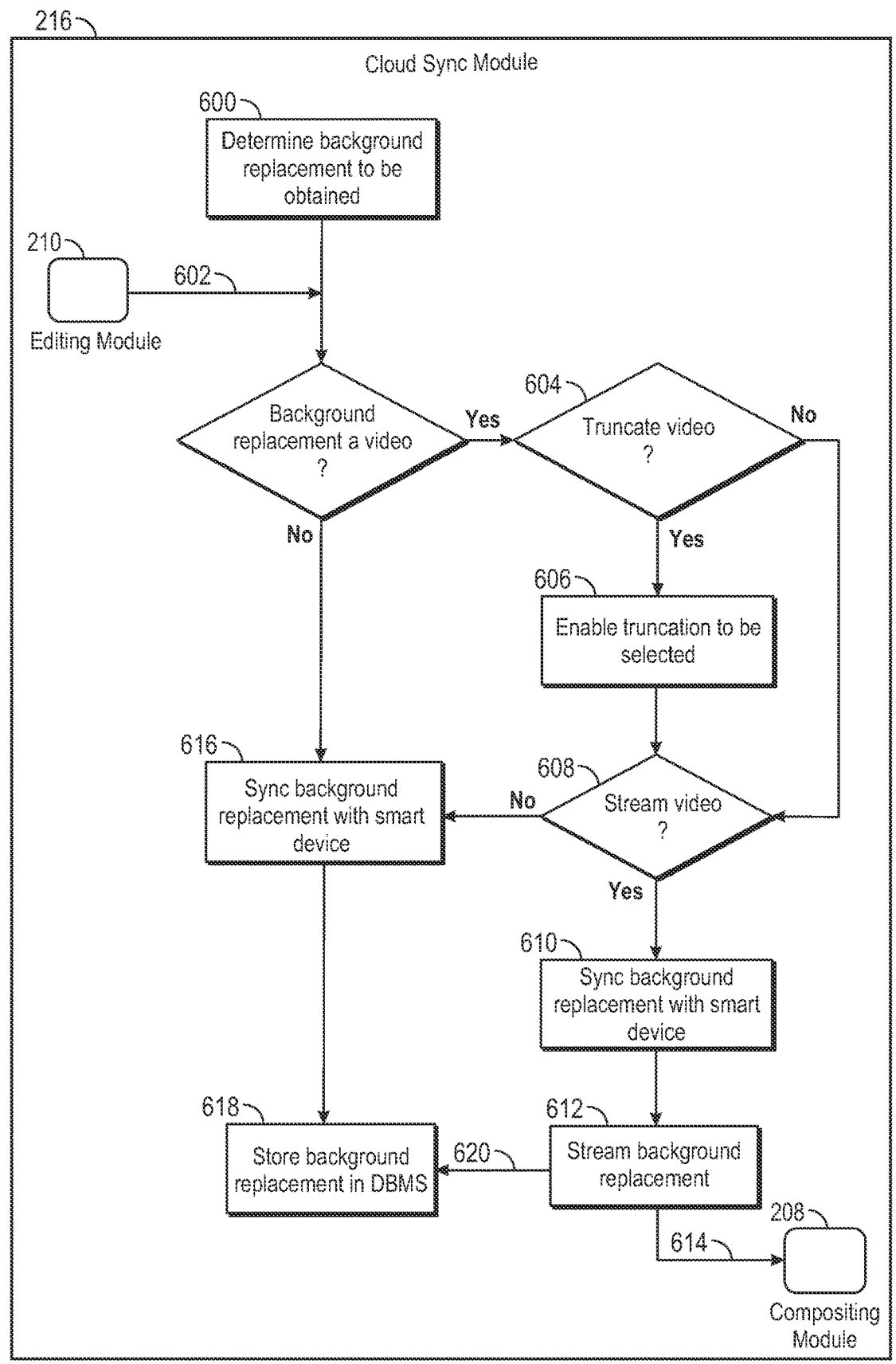
FIG. 14 depicts a flowchart for the streaming background module operation of the system in FIG. 10

Syncing Smart Device with Cloud Server for Background Replacement Content. With reference now to FIG. 14, there is shown a method and operational flowchart for a cloud sync module 216, which, provides a platform to sync a cloud server 224 with the smart device 200, thereby enabling background replacement videos to be streamed to the smart device, or background replacement images/videos to be downloaded to the DBMS for future playback. These background replacement files will subsequently be used for the creation of a Chroma key composite image/video. More specifically, large background replacement files may not need to be truncated due to the smaller file size of buffered streaming content, or alternatively, the cloud sync module 216 can truncate and loop a small portion to be streamed. Streaming such files avoids taking up unnecessary storage on a smart device due to downloading the files, and also avoids the smart device in using up excessive computing power to process such large files.

The cloud sync 216 module will first access a remote cloud-based server 224 to identify 600 the desired background replacement, which, was previously stored on the remote cloud server 224 by a user. The editing module 210 may then be accessed 602, which as aforementioned, enables the selected background replacement file to be edited with the features available on the cloud server, including transcoding the file to a format suitable for the system platform 202. If the selected background replacement file is a video, the cloud sync module 216 will then determine 604 whether the entire video or only a portion is desired to be used, wherein if only a portion is desired, the cloud sync module 216 will enable the video to be truncated 606 to the desired length and content. The cloud sync module 216 will then determine 608 whether the background replacement video will be streamed. If the background replacement video is to be streamed, the cloud sync module 216 will sync 610 the video file with the smart device 200, enabling the video file to subsequently be streamed 612 directly as a background replacement 614 for an image/video being captured, via the compositing module 208, wherein the video can be continuously looped if desired. The streamed background replacement video file can further be stored 620 in the DBMS for future playback. In the alternative to streaming, the cloud sync module will sync 616 the cloud server to the smart device, enabling the background replacement image or background replacement video to be downloaded and stored 618 directly to the DBMS. The compositing module 208 can then playback and layer the stored background replacement image/video behind a captured image/video of a subject.

Background Replacement Capture. With reference to FIG. 10, the system platform 202 enables a user to receive background replacement content using another software application (not shown) that can capture content available on the Internet 222, and store the data on a remote cloud storage server 224. The software application can recognize copyright protected content through watermarks affixed to the content, such that the user will be unable to store said content to the cloud server 224. Once a desired image/video has been stored onto the cloud server 224, the system platform 202 can sync the smart device 200 with the obtained content for use in a Chroma key composite, and/or for storage onto the smart device 200 for future playback, as accomplished via the cloud sync module 216.

Figure 15:
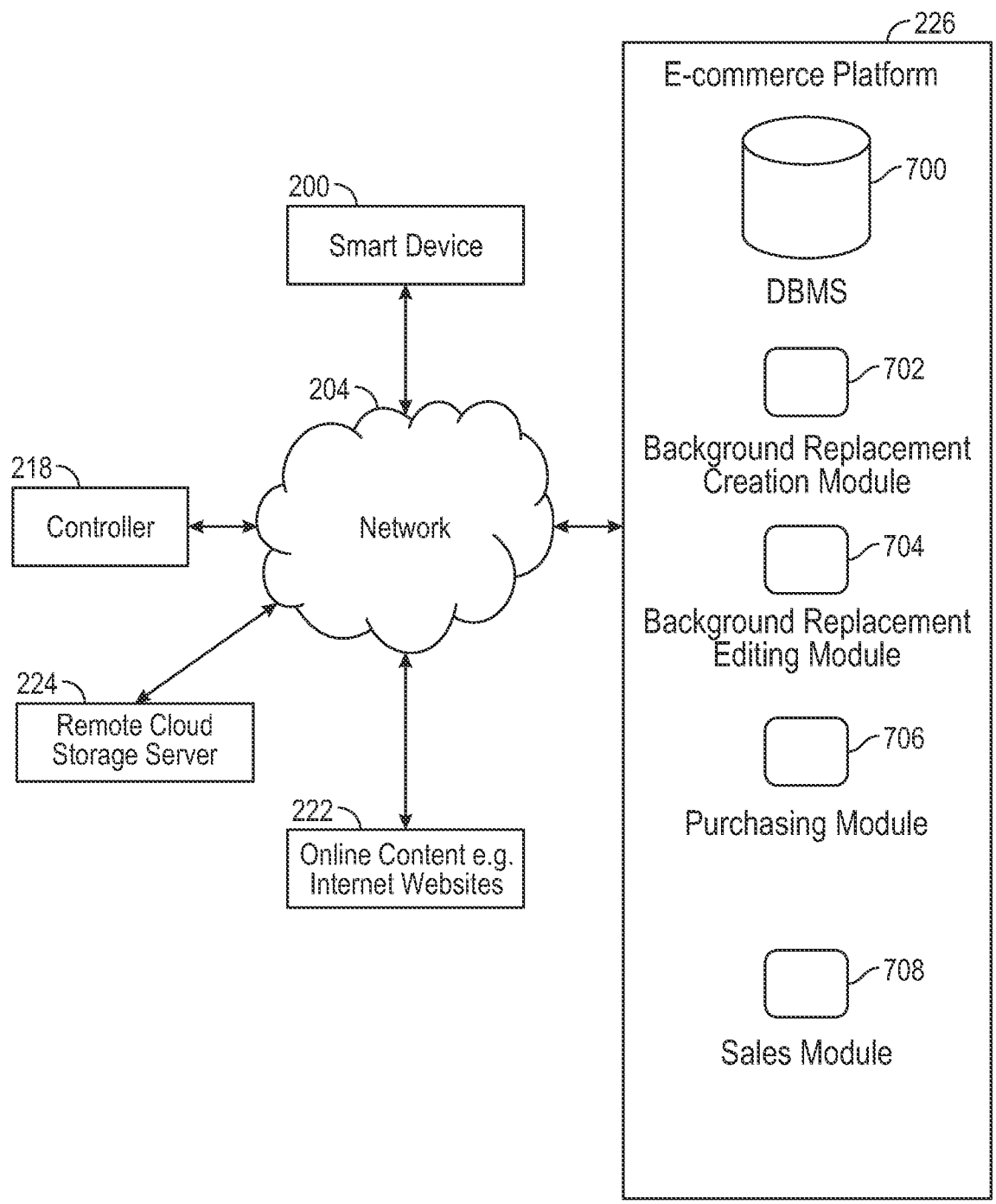
FIG. 15 depicts a simplified block diagram of an e-commerce background replacement system in accordance with the invention.

Background replacement E-commerce Platform. With reference now to FIG. 15, there is shown a system that provides users with a platform to create, edit, and exchange background replacement content, wherein the exchange can be through a monetary transaction. The system includes a database management system (DBMS) 700 that maintains detailed data relating to background replacement library, user information, and other pertinent information for enabling access and conducting transactions on an e-commerce website. The system further includes a background replacement content module 702, a background replacement editing module 704, a purchasing module 706, and a sales module 708.

The background replacement creation module 702 enables a user to create background replacement content for use on the user's smart device, and/or for others to purchase. The background replacement content can be created in any file type format. The background replacement editing module enables a user to take an existing background replacement file, either purchased or uploaded from the user's smart device, and enables the background replacement file to be edited as desired. The purchasing module enables the user to browse available background replacement content on the e-commerce server, via the background replacement library, and purchase the preferred background replacement content to create composite content. The purchased background replacement content can subsequently be stored onto a remote cloud server 224 for future syncing with the smart device 200, enabling the background replacement content to be streamed or stored onto the smart device 200 for future playback, as accomplished by the cloud sync module 216. Moreover, a user can affix the content with watermarks to ensure the content cannot be used without authorization. The sales module 708 enables a user to identify background replacement content created and/or owned by a user that is desired to be placed for sale, wherein the user can specify a price.

It should be appreciated from the foregoing that the present invention provides a system and, related method, for portably enabling Chroma key compositing where an image/video of a subject situated in front of a portable monochromatic background is captured using a smart device, and simultaneously layered over a different desired background replacement content. The system further enables the visibility of the monochromatic color to be removed, revealing the background replacement content as being located behind the subject. The portable monochromatic background structure can be a three-dimensional lighting structure or pop-up screen that is affixed with a plurality of lighting modules configured to ensure a uniform light distribution across the monochromatic color background. Moreover, a software application on a smart device can act as a system platform that enables for automatic light adjustment of the lighting modules on a monochromatic background, to correct for any lighting imperfections that impede color neutrality on the background, wherein the system platform and a controller are in operative communication with the lighting modules. Moreover, the system platform enables background replacement content stored on a cloud server to be synced to a smart device, enabling the background replacement content to be streamed or stored on the smart device for future playback, and used in a Chroma key composite creation.

The present invention has been described above in terms of presently preferred embodiments so that an understanding of the present invention can be conveyed. However, there are other embodiments not specifically described herein for which the present invention is applicable. Therefore, the present invention should not be seen as limited to the forms shown, which is to be considered illustrative rather than restrictive.

Computing systems and/or logic referred to herein can comprise an integrated circuit, a microprocessor, a personal computer, a server, a distributed computing system, a communication device, a network device, or the like, and various combinations of the same. A computing system or logic may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), optical circuits, and/or other devices configured for storing analog or digital information, such as in a database. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein may include hardware, firmware and/or software stored on a non-transient computer readable medium. This logic may be implemented in an electronic device to produce a special purpose computing system. The systems discussed herein optionally include a (micro) processor configured to execute any combination of the logic discussed herein. The methods discussed herein optionally include execution of the logic by said microprocessor.

What is claimed is:

1. A computer implemented system for Chroma key compositing and automated lighting adjustment, comprising:
 a background structure, the background structure including a vertical surface, the surface including a monochromatic color or a distinguishing pattern;
 a subject region disposed in front of the surface;
 a plurality of light sources configured to illuminate the surface and a subject within the subject region; and
 a processor configured to control the plurality of light sources and configured to identify each light source of the plurality of light sources as either illuminating the surface or the subject, wherein the processor is configured to dim or brighten one or more of the plurality of light sources to achieve a balanced lighting of the surface and the subject.

2. The system of claim 1, wherein the processor is configured to identifying each light source by 1) receiving an identification from a user or 2) varying an output of each light source and detecting a change in lighting within a captured image.

3. The system of claim 1, further comprising: a computing device display, a camera; and a software application, the software application being stored on a non-transient media, the software application being configured to replace an image of the surface obtained using the camera with a background image, video, or virtual environment to create a composite image, video or virtual environment including the subject, the background image video and/or a virtual environment.

4. The system of claim 1, further comprising: a computing device display, a camera; and a software application, the software application being stored on a non-transient media, the software application being configured to replace an image of the surface obtained using the camera with a background image to create a composite image including the subject the background image including a video frame.

5. The system of claim 1, further comprising: a computing device display, a camera; and a software application, the software application being stored on a non-transient media, the software application being configured to replace an image of the monochromatic area obtained using the camera with a geographical mapping of a location to determine what background image, video, animation, still photo, game, or virtual environment in which to create a composite image, video or virtual environment, including the subject, the background image video and/or a virtual environment and stream the resulting video.

6. The system of claim 1, further comprising: a computing device display, a camera; and a software application, the software application being stored on a non-transient media, the software application being configured to replace an image of the monochromatic area obtained using the camera with a background image streamed from an eCommerce repository to create a composite image, video or virtual environment, including the subject, the background image video and/or a virtual environment and stream the resulting video.

7. The system of claim 1, further comprising: a computing device display, a camera; and a software application, the software application being stored on a non-transient media, the software application being configured to replace an image of the monochromatic area obtained using the camera with an augmented reality-generated background image to create a composite image, video or virtual environment, including the subject, the background image video and/or a virtual environment.

8. The system of claim 1, further comprising: a computing device display, a camera; and a software application, the software application being stored on a non-transient media, the software application being configured to replace multiple surfaces, each of the surfaces having different distinguishing characteristics, with background images to create multiple composite images within an image, video or virtual environment.

9. The system of claim 1, further comprising: a computing device display, a camera; and a software application, the software application being stored on a non-transient media, the software application being configured to replace an image of the surface obtained using the camera with a background image and adjust visual characteristics of the background image to match lighting of the subject, to create a composite image, video or virtual environment, including the subject.

10. The system of claim 1, further comprising: a computing device display, a camera; and a software application, the software application being stored on a non-transient media, the software application being configured to replace an image of the surface obtained using the camera with a background image, the background image being a still image, a part of a video or a view of a virtual environment, to create a composite image including the subject and the background image, and further configured to adjust these the composite image so that the background image and the subject have the similar dynamic ranges in pixel intensity.

11. The system of claim 1, wherein the software application is further configured to retrieve the background image from a library of images, the library of images including still images, videos or virtual environments.

12. The system of claim 1, wherein the software application is configured to control blurring of the background replacement image.

13. The system of claim 1, wherein the software application is configured to automatically adjust brightness of the background image relative to a brightness of the subject by controlling the brightness of one or more of the plurality of light sources.

* * * * *